US011978407B2

(12) United States Patent
Lee et al.

(10) Patent No.: US 11,978,407 B2
(45) Date of Patent: May 7, 2024

(54) DISPLAY DEVICE

(71) Applicant: SAMSUNG DISPLAY CO., LTD., Yongin-si (KR)

(72) Inventors: Jae Hoon Lee, Yongin-si (KR); Hyun Bo Byun, Yongin-si (KR); Kyoung Ho Lim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/327,827

(22) Filed: Jun. 1, 2023

(65) Prior Publication Data

US 2023/0317019 A1 Oct. 5, 2023

Related U.S. Application Data

(63) Continuation of application No. 17/572,577, filed on Jan. 10, 2022, now Pat. No. 11,670,248, which is a (Continued)

(30) Foreign Application Priority Data

Jun. 3, 2019 (KR) ........................ 10-2019-0065405

(51) Int. Cl.
*G09G 3/3291* (2016.01)

(52) U.S. Cl.
CPC ..... *G09G 3/3291* (2013.01); *G09G 2310/027* (2013.01)

(58) Field of Classification Search
CPC ..... G09G 2300/0452; G09G 2310/027; G09G 2320/0295; G09G 2320/045;
(Continued)

(56) References Cited

U.S. PATENT DOCUMENTS 9,153,176 B2 10/2015 Jun et al.
9,881,558 B2 1/2018 Lee et al.
(Continued)

FOREIGN PATENT DOCUMENTS

JP 2007-199683 A 8/2007
JP 2010-192138 A 9/2010
(Continued)

OTHER PUBLICATIONS

Woo-Sic Kim, et al. "Effect of Wavelength and Intensity of Light on a-InGaZnO TFTs under Negative Bias Illumination Stress" ECS Journal of Solid State Science and Technology, 2017, vol. 6, No. 1, pp. Q6-Q9.

*Primary Examiner* — Dmitriy Bolotin
(74) *Attorney, Agent, or Firm* — Lewis Roca Rothgerber Christie LLP

(57) ABSTRACT

A display device includes a display panel including a first data line, a second data line, and a pixel, the pixel including a first sub-pixel coupled to the first data line, and a second sub-pixel coupled to the second data line, a light stress compensator configured to generate a first data voltage control signal for the first sub-pixel based on a second data value of input image data for the second sub-pixel, in response to a first data value of input image data for the first sub-pixel being equal to or less than a first reference value, and a data driver configured to generate a first data signal based on the first data value for the first sub-pixel, to provide a first data voltage to the first data line, and to vary the first data voltage based on the first data voltage control signal.

16 Claims, 22 Drawing Sheets

Related U.S. Application Data continuation of application No. 16/827,397, filed on Mar. 23, 2020, now Pat. No. 11,222,604.

(58) Field of Classification Search

CPC .. G09G 2340/00; G09G 2360/16; G09G 3/20; G09G 3/3291

See application file for complete search history.

(56) References Cited

U.S. PATENT DOCUMENTS

| | | | | |
|---|---|---|---|---|
| 10,121,425 | B2 | 11/2018 | Ahn et al. | |
| 10,354,575 | B2 | 7/2019 | Yang et al. | |
| 10,529,277 | B2 | 1/2020 | Lee et al. | |
| 11,222,604 | B2 | 1/2022 | Lee et al. | |
| 11,670,248 | B2 * | 6/2023 | Lee | G09G 3/3233 345/204 |
| 2007/0252782 | A1 | 11/2007 | Yui | |
| 2011/0279444 | A1 | 11/2011 | Chung et al. | |
| 2015/0170607 | A1 | 6/2015 | Shin | |
| 2015/0235616 | A1 | 8/2015 | Wu | |
| 2016/0049123 | A1 | 2/2016 | Jeong et al. | |
| 2016/0133176 | A1 | 5/2016 | Oh et al. | |
| 2018/0061320 | A1 | 3/2018 | Kim et al. | |
| 2018/0357944 | A1 | 12/2018 | Tang et al. | |
| 2019/0130837 | A1 | 5/2019 | Chen | |
| 2020/0135100 | A1 | 4/2020 | Park | |
| 2020/0380920 | A1 | 12/2020 | Lee et al. | |
| 2021/0134233 | A1 | 5/2021 | Huang | |
| 2021/0151483 | A1 | 5/2021 | Feng et al. | |
| 2021/0193056 | A1 | 6/2021 | Piao | |

FOREIGN PATENT DOCUMENTS

| | | | |
|---|---|---|---|
| KR | 10-2014-0141328 | A | 12/2014 |
| KR | 10-2016-0020029 | A | 2/2016 |
| KR | 10-2016-0049166 | A | 5/2016 |
| KR | 10-2018-0025399 | A | 3/2018 |
| KR | 10-2018-0032720 | A | 4/2018 |
| KR | 10-2018-0131706 | A | 12/2018 |
| KR | 10-2020-0047925 | A | 5/2020 |

* cited by examiner

| | 1 | 2 | 3 | 4 | 5 | 6 | 7 | 8 | 9 | 10 | 11 | 12 |
|---|---|---|---|---|---|---|---|---|---|---|---|---|
| 1 | 255 | 255 | 255 | 31 | 255 | 255 | 0 | 255 | 255 | 0 | 255 | 255 |
| 2 | 255 | 255 | 31 | 31 | 255 | 31 | 0 | 255 | 31 | 0 | 255 | 31 |
| 3 | 255 | 255 | 0 | 31 | 255 | 0 | 0 | 255 | 0 | 0 | 255 | 0 |
| 4 | 255 | 31 | 255 | 31 | 31 | 255 | 0 | 31 | 255 | 0 | 31 | 255 |
| 5 | 255 | 31 | 0 | 31 | 31 | 0 | 0 | 31 | 0 | 0 | 31 | 0 |
| 6 | 255 | 0 | 255 | 31 | 0 | 255 | 0 | 0 | 255 | 0 | 0 | 255 |
| 7 | 255 | 0 | 31 | 31 | 0 | 31 | 0 | 0 | 31 | 0 | 0 | 31 |
| 8 | 255 | 0 | 0 | 31 | 0 | 0 | 0 | 0 | 0 | 0 | 0 | 0 |

DISPLAY DEVICE

CROSS-REFERENCE TO RELATED APPLICATIONS

This application is a continuation of U.S. patent application Ser. No. 17/572,577, filed Jan. 10, 2022, which is a continuation of U.S. patent application Ser. No. 16/827,397, filed Mar. 23, 2020, now U.S. Pat. No. 11,222,604, which claims priority to and the benefit of Korean Patent Application No. 10-2019-0065405, filed Jun. 3, 2019, the entire content of all of which is incorporated herein by reference.

BACKGROUND

1. Field

Aspects of the present invention relate to a display device.

2. Description of Related Art

Display devices include a display panel and a driver. The display panel includes scan lines, data lines, and pixels. The driver includes a scan driver that sequentially supplies scan signals to the scan lines, and a data driver that supplies data signals to the data lines. Each of the pixels emits light at a luminance corresponding to the data signal supplied through the corresponding data line in response to the scan signal supplied through the corresponding scan line.

The display device displays an image through the pixels. Each of the pixels includes a light emitting element and a transistor supplying a driving current to the light emitting element.

SUMMARY

Characteristics (e.g., voltage-current characteristics) of a transistor may be changed by continuously incident light. The luminance of a pixel may be changed or an after-image may be created due to a change in characteristics of the transistor. Furthermore, when a gate-source voltage of the transistor is smaller than a threshold voltage, the change in characteristics of the transistor by light may be accelerated.

Aspects of embodiments of the present invention are directed to a display device capable of mitigating a change in characteristics of the transistor.

According to some embodiments of the present invention, there is provided a display device including: a display panel including a first data line, a second data line, and a pixel, the pixel including a first sub-pixel coupled to the first data line, and a second sub-pixel coupled to the second data line; a light stress compensator configured to generate a first data voltage control signal for the first sub-pixel based on a second data value of input image data for the second sub-pixel, in response to a first data value of input image data for the first sub-pixel being equal to or less than a first reference value; and a data driver configured to generate a first data voltage based on the first data value for the first sub-pixel, to provide a first data voltage to the first data line, and to vary the first data voltage based on the first data voltage control signal.

In some embodiments, the first data voltage control signal is a black bias offset voltage corresponding to a minimum value in a range of the first data value.

In some embodiments, the light stress compensator is configured to generate the first data voltage control signal based on the second data value, in response to the first data value being equal to or less than the first reference value and the second data value being more than a second reference value.

In some embodiments, the first reference value corresponds to a minimum grayscale value.

In some embodiments, the display device further includes: a compensator coupled to the first sub-pixel to detect characteristic information of the first sub-pixel, wherein the first sub-pixel includes a light emitting element and a first transistor configured to supply a driving current to the light emitting element in response to the first data voltage, and wherein the characteristic information is a threshold voltage of the first transistor, and the first data value is varied based on the characteristic information.

In some embodiments, the second reference value is the same as the first reference value.

In some embodiments, the black bias offset voltage of the first sub-pixel has a first voltage level, in response to the second data value of the second sub-pixel being larger than the second reference value, and the black bias offset voltage has a second voltage level that is higher than the first voltage level, in response to the second data value of the second sub-pixel being equal to or less than the second reference value.

In some embodiments, as the second data value increases, the second voltage level increases.

In some embodiments, the data driver is configured to vary data voltages in a range of whole grayscale values based on the black bias offset voltage.

In some embodiments, the data driver is configured to adjust data voltages corresponding to data values between the minimum value and the first reference value based on the black bias offset voltage.

In some embodiments, the light stress compensator is configured to generate a second data voltage control signal based on the first data value for the first sub-pixel, in response to the second data value being equal to or less than a second reference value, and the data driver is configured to generate the second data voltage based on the second data value, and to vary the second data voltage based on the second data voltage control signal.

In some embodiments, a first variation rate of the second data voltage according to the first data value is different from a second variation rate of the first data voltage according to the second data value.

In some embodiments, the first sub-pixel is configured to emit light of a first color, and the second sub-pixel is configured to emit light of a second color that is different from the first color.

In some embodiments, the first sub-pixel includes a light emitting element and a first transistor configured to supply a driving current to the light emitting element in response to the first data voltage, and the first transistor includes an oxide semiconductor.

In some embodiments, the display panel further includes: power lines extending in a first direction in a plan view and arranged along a second direction intersecting with the first direction, the power lines being configured to supply a power voltage, and scan lines extending in the second direction and arranged along the first direction, wherein the pixel is provided in an area partitioned by the power lines and the scan lines, and wherein the power lines are coupled to a cathode electrode of the light emitting element.

In some embodiments, the light emitting element includes an organic light emitting element, and a cathode of the organic light emitting element is in direct contact with the power lines through an opening that is formed to overlap one of the power lines.

In some embodiments, the first transistor includes a first gate electrode, a semiconductor layer on the first gate electrode, and a second gate electrode on the semiconductor layer, wherein the first gate electrode is coupled to one of the scan lines, and wherein the second gate electrode is coupled to an anode electrode of the light emitting element.

In some embodiments, the first sub-pixel further includes a first light conversion layer on the light emitting element to shift a wavelength of light emitted from the light emitting element.

According to some embodiments of the present invention, there is provided a display device including: a display panel divided into a plurality of display areas, first sub-pixels and second sub-pixels being provided in each of the display areas; a light stress compensator configured to calculate a first average data value for the first sub-pixels in a first display area among the display areas and a second average data value for the second sub-pixels in the first display area based on input image data, and to generate a first data voltage control signal for the first sub-pixels based on the second average data value, in response to the first average data value being equal to or less than a first reference value; and a data driver configured to generate a first data voltage based on a first data value for one of the first sub-pixels, to provide the first data voltage to the one of the first sub-pixels, and to vary the first data voltage based on the first data voltage control signal.

In some embodiments, the plurality of display areas are divided by a preset reference block.

In some embodiments, the light stress compensator is configured to generate the first data voltage control signal based on the second average data value, i response to the first average data value being equal to or less than the first reference value and the second average data value being more than a second reference value.

In some embodiments, the data driver is configured to vary a black bias offset voltage corresponding to a minimum data value based on the first data voltage control signal.

In some embodiments, the black bias offset voltage of the first sub-pixels has a first voltage level, in response to the second average data value being larger than the second reference value, and the black bias offset voltage has a second voltage level that is higher than the first voltage level, in response to the second average data value being equal to or less than the second reference value.

In some embodiments, as the second average data value increases, the second voltage level increases.

In some embodiments, the light stress compensator is configured to determine a reference block by analyzing a histogram for the input image data, and to divide the display panel based on the reference block to determine the display areas.

In some embodiments, the light stress compensator is configured to detect an outline from the input image data, determines whether the outline is a still image, and determines an area defined by the outline as the first display area when the outline is the still image.

According to some embodiments of the present invention, there is provided a display device including: a display panel including a pixel, the pixel including a plurality of sub-pixels; a light stress compensator configured to determine whether the pixel satisfies light stress conditions in which a first sub-pixel among the plurality of sub-pixels emits no light and a second sub-pixel emits light based on input image data, and to generate a first data voltage control signal for the first sub-pixel based on a second data value for the second sub-pixel in response to the pixel satisfying the light stress conditions; and a data driver configured to generate a first data voltage based on a first data value for the first sub-pixel, to provide the first data voltage to the first sub-pixel, and to vary the first data voltage based on the first data voltage control signal.

DETAILED DESCRIPTION

Figure 1A:
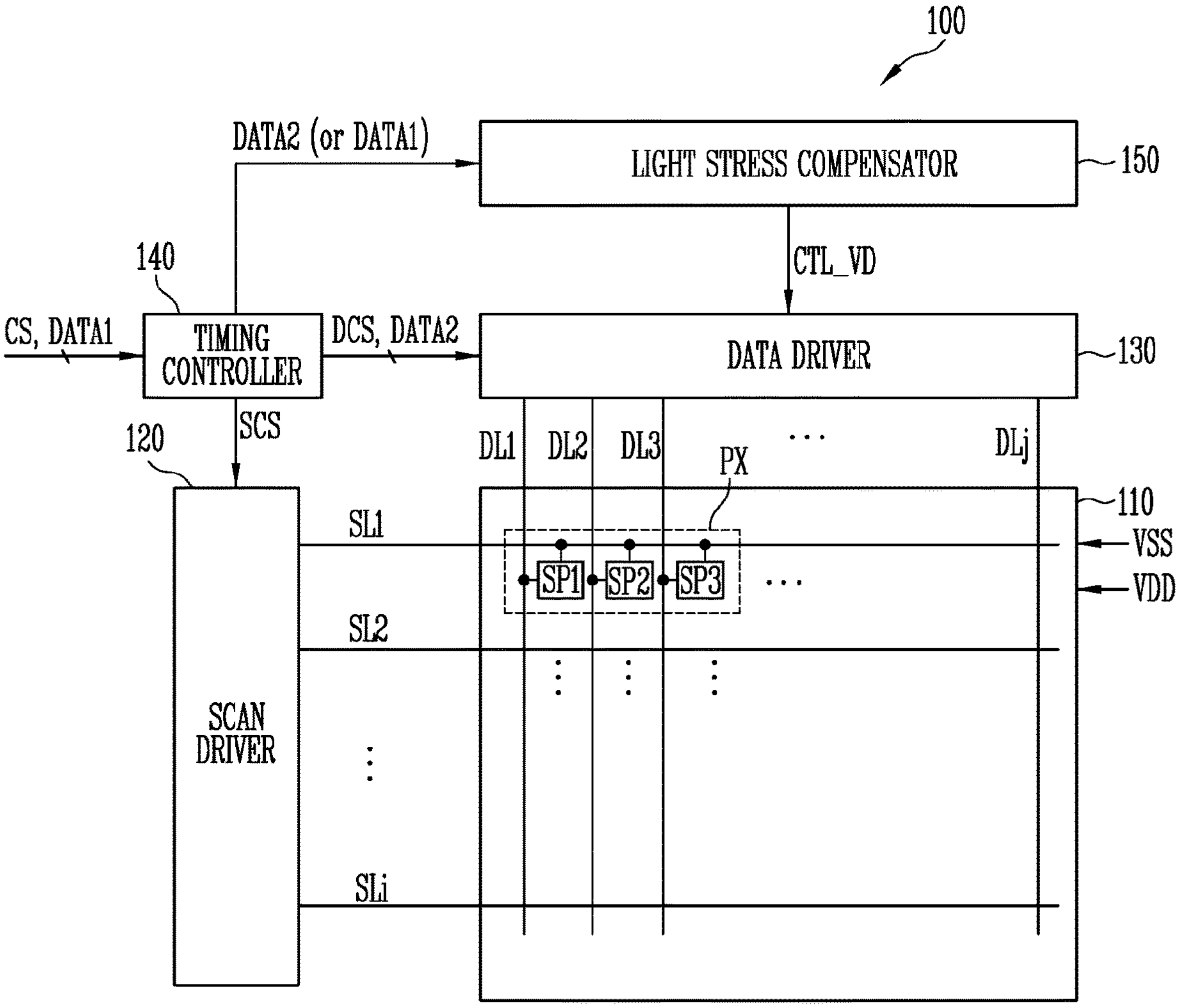
FIG. 1A is a block diagram illustrating a display device according to exemplary embodiments of the present invention.

Reference will now be made in detail to various embodiments of the present invention, specific examples of which are illustrated in the accompanying drawings and described below, since the embodiments of the present invention can be variously modified in many different forms. However, the present invention is not limited to the following embodiments and may be modified into various forms.

Some elements which are not directly related to the features of the present invention in the drawings may be omitted to clearly explain the present invention. Furthermore, the sizes, ratios, etc. of some elements in the drawings may be slightly exaggerated. It should be noted that the same reference numerals are used to designate the same or similar elements throughout the drawings, and repetitive explanation will be omitted.

FIG. 1A is a block diagram illustrating a display device according to exemplary embodiments of the present invention.

Referring to FIG. 1A, the display device 100 may include a display 110 (or display panel), a scan driver 120 (or gate driver), a data driver 130 (or source driver), a timing controller 140, and a light stress compensator 150.

The display 110 may include scan lines SL1 to SLi (i is a positive integer), data lines DL1 to DLj (j is a positive integer), and a pixel PX. The pixel PX may include sub-pixels SP1, SP2, and SP3. The sub-pixels SP1, SP2, and SP3 may be disposed or provided in an area (e.g., sub-pixel area) delimited by the scan lines SL1 to SLi and the data lines DL1 to DLj.

Each of the sub-pixels SP1, SP2, and SP3 may be electrically coupled to at least one of the scan lines SL1 to SLi and one of the data lines DL1 to DLj. For example, the first sub-pixel SP1 may be coupled to the first scan line SL1 and the first data line DL1, the second sub-pixel SP2 may be coupled to the first scan line SL1 and the second data line DL2, and the third sub-pixel SP3 may be coupled to the first scan line SL1 and the third data line DL3.

The first sub-pixel SP1 may emit light at a luminance corresponding to a first data signal supplied through the first data line DL1 in response to a scan signal supplied through the first scan line SL1. Likewise, the second sub-pixel SP2 may emit light at a luminance corresponding to a second data signal supplied through the second data line DL2, and the third sub-pixel SP3 may emit light at a luminance corresponding to a third data signal supplied through the third data line DL3.

In an exemplary embodiment, the first sub-pixel SP1 may emit light of a first color (e.g., red), the second sub-pixel SP2 may emit light of a second color (e.g., green), and the third sub-pixel SP3 may emit light of a third color (e.g., blue). Although FIG. 1A illustrates that the pixel PX includes three sub-pixels SP1, SP2, and SP3, the pixel PX is not limited thereto. For example, the pixel PX may include four or more sub-pixels.

First and second power voltages VDD and VSS may be supplied to the display 110. The first and second power voltages VDD and VSS are voltages used to operate the pixel PX. The first power voltage VDD may have a voltage level higher than that of the second power voltage VSS. The first and second power voltages VDD and VSS may be supplied from a separate power supply to the display 110.

The scan driver 120 may generate a scan signal based on a scan control signal SCS, and may sequentially supply the scan signal to the scan lines SL1 to SLi. Here, the scan control signal SCS may include a start signal (or a start pulse), clock signals and the like, and may be supplied from the timing controller 140. For example, the scan driver 120 may include a shift register (or stage) that sequentially generates and outputs the scan signal in the form of a pulse corresponding to the start signal in the form of a pulse using clock signals.

The data driver 130 may generate data signals based on image data DATA2 and the data control signal DCS supplied from the timing controller 140, and may supply the data signals to the display 110 (or pixel PX). Here, the data control signal DCS is a signal for controlling the operation of the data driver 130, and may include a load signal (or a data enable signal) for instructing the output of a valid data signal.

In an exemplary embodiment, the data driver 130 may generate a data signal corresponding to a data value (or grayscale value) included in the image data DATA2 using gamma voltages. Here, the gamma voltages may be generated from the data driver 130, or supplied from a separate gamma voltage generation circuit (e.g., gamma integrated circuit). For example, the data driver 130 may select one of the gamma voltages based on the data value and then output it as the data signal.

For example, the data driver 130 may generate a first data signal based on the first data value for the first sub-pixel SP1, generate a second data signal based on the second data value for the second sub-pixel SP2, and generate a third data signal based on the third data value for the third sub-pixel SP3. Here, the first data value, the second data value and the third data value may be included in the image data DATA2 (or, input image data DATA1). Expressions "the data value of the sub-pixel" and "the data value for the sub-pixel" mean a grayscale value that is included in the image data DATA2 (or input image data DATA1) and is used to generate data voltage of a corresponding sub-pixel.

In an exemplary embodiment, the data driver 130 may vary the data signal (or data voltage) based on a data voltage control signal CTL_VD. Here, the data voltage control signal CTL_VD may be supplied from the light stress compensator 150, may include information about black bias offset voltage or may be black bias offset voltage. The black bias offset voltage may be equal to the data voltage supplied to the corresponding sub-pixel in response to a minimum data value (e.g., the grayscale value of 0).

The data voltage control signal CTL_VD may include at least one of the first data voltage control signal (or first black bias offset voltage) about the first sub-pixel SP1, the second data voltage control signal (or second black bias offset voltage) about the second sub-pixel SP2, and the third data voltage control signal (or third black bias offset voltage) about the third sub-pixel SP3.

The configuration for varying the data signal in the data driver 130 will be described below with reference to FIGS. 10A and 10B.

The timing controller 140 may receive input image data DATA1 and the control signal CS from an external device (e.g., graphic processor), generate the scan control signal SCS and the data control signal DCS based on the control signal CS, and convert the input image data DATA1 to generate image data DATA2. Here, the control signal CS may include a vertical synchronization signal, a horizontal synchronization signal, a clock signal and the like. For example, the timing controller 140 may convert the input image data DATA1 into the image data DATA2 having a format available in the data driver 130.

The light stress compensator 150 determines whether the pixel PX satisfies light stress conditions based on the image data DATA2 (or input image data DATA1). If the pixel PX satisfies the light stress conditions, the data voltage control signal CTL_VD for the sub-pixel that does not emit light in the pixel PX based on the data value of the sub-pixel that emits light in the pixel PX may be generated.

The light stress conditions may be a case where at least one of the sub-pixels SP1, SP2, and SP3 emits no light and at least one different sub-pixel emits light. That is, the light stress conditions may be a case where the pixel PX includes at least one sub-pixel which emits no light and at least one sub-pixel which emits light. For example, when the first sub-pixel SP1 emits no light and the second sub-pixel SP2 emits light, the light stress compensator 150 may determine that the pixel PX satisfies the light stress conditions.

In an exemplary embodiment, if the data value for the corresponding sub-pixel is equal to or less than a reference value (or reference data value, reference grayscale value), the light stress compensator 150 may determine that the corresponding sub-pixel emits no light (or non-emissive sub-pixel). If the data value for the corresponding sub-pixel is larger than the reference value, the light stress compensator 150 may determine that the corresponding sub-pixel emits light (or emissive sub-pixel).

For example, if the first data value for the first sub-pixel SP1 is equal to or less than a first reference value (e.g., grayscale value of 10 or 0 among grayscale values ranging from 0 to 255), the light stress compensator 150 may determine that the first sub-pixel SP1 emits no light. If the first data value is larger than a first reference value, the light stress compensator 150 may determine that the first sub-pixel SP1 emits light. For example, if the second data value for the second sub-pixel SP2 is equal to or less than a second reference value (e.g., grayscale value of 10 or 0 among grayscale values ranging from 0 to 255), the light stress compensator 150 may determine that the second sub-pixel SP2 emits no light. If the second data value is larger than a second reference value, the light stress compensator 150 may determine that the second sub-pixel SP2 emits light. For example, if the third data value for the third sub-pixel SP3 is equal to or less than a third reference value (e.g., grayscale value of 10 or 0 among grayscale values ranging from 0 to 255), the light stress compensator 150 may determine that the third sub-pixel SP3 emits no light. If the third data value is larger than a third reference value, the light stress compensator 150 may determine that the third sub-pixel SP3 emits light. The first to third reference values may be set to be equal to or different from each other.

In an exemplary embodiment, at least some of data values that are equal to or less than the first reference value may correspond to a negative voltage or may be smaller than the threshold voltage of the transistor in the first sub-pixel SP1. For example, the data voltage corresponding to the data value of 0 of the first sub-pixel SP1 may be −0.4 V. This is because a change in characteristics of the transistor due to light is accelerated when a gate-source voltage of the transistor is smaller than the threshold voltage or when a negative voltage is applied to the gate electrode of the transistor.

In an exemplary embodiment, the first reference value may vary over time. For example, when the threshold voltage of the transistor is negatively shifted, the first reference value may be increased in response to the shifted threshold voltage.

At least one of the scan driver 120, the data driver 130, the timing controller 140 and the light stress compensator 150 may be formed on the display 110, or may be implemented as an IC and mounted on a flexible circuit board to be coupled to the display 110. In addition, at least two of the scan driver 120, the data driver 130, the timing controller 140, and the light stress compensator 150 may be implemented as a single IC. For example, the light stress compensator 150 may be implemented as the single IC with the timing controller 140 or the data driver 130.

As described with reference to FIG. 1, when the pixel PX satisfies the light stress conditions, the display device 100 may increase the data voltage for the non-emissive sub-pixel in the pixel PX based on the data value of the emissive sub-pixel in the pixel PX. In this case, the negative bias light stress (i.e., light stress in the state where negative voltage is applied) of the driving transistor of the non-emissive sub-pixel may be mitigated, and the change in characteristics of the driving transistor may be mitigated.

Figure 1B:
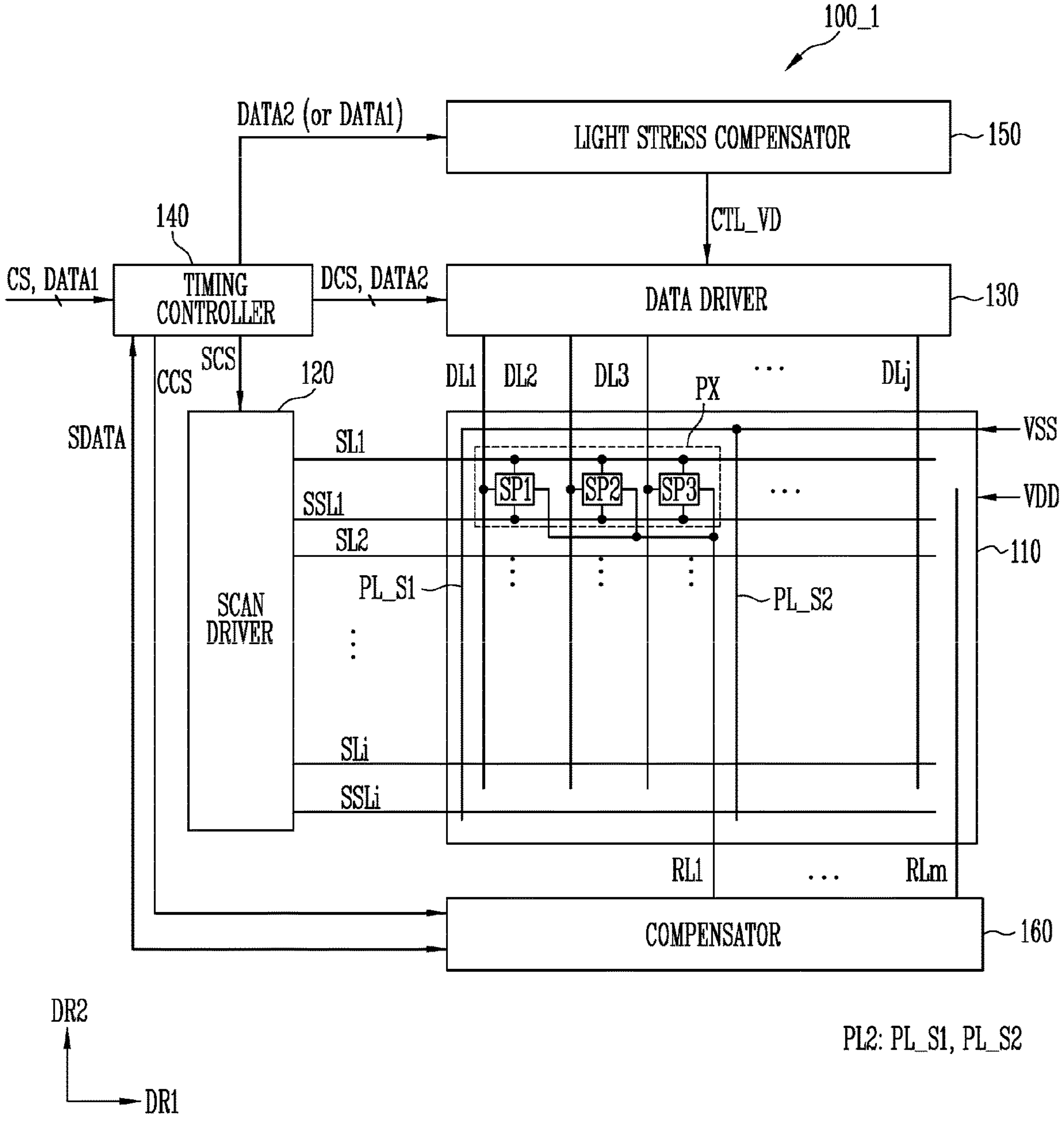
FIG. 1B is a block diagram illustrating an example of the display device of FIG. 1A.

FIG. 1B is a block diagram illustrating an example of the display device of FIG. 1A.

Referring to FIGS. 1A and 1B, the display device 100_1 of FIG. 1B is different from the display device 100 of FIG. 1A in that the display device 100_1 of FIG. 1B further includes a compensator 160 (or compensation circuit). Since the display device 100_1 of FIG. 1B is substantially equal or similar to the display device 100 of FIG. 1A except for the compensator 160, a duplicated description thereof is not repeated herein.

The display 110 may include a second power line PL2, sensing control lines SSL1 to SSLi, and sensing lines RL1 to RLm (m represents j/3) (or readout lines).

The second power voltage VSS is applied to the second power line PL2. The second power line PL2 may include sub-power lines PL_S1 and PL_S2. The sub-power lines PL_S1 and PL_S2 may extend in a second direction DR2, and may be arranged in a first direction DR1. The sub-power lines PL_S1 and PL_S2 may be spaced apart from each other by the size of the pixel PX. In this case, the pixel PX may be disposed or provided in an area (e.g., pixel area) delimited by the sub-power lines PL_S1 and PL_S2 and the scan lines SL1 to SLj. As will be described with reference to FIG. 4A, the second power line PL2 may be coupled in parallel with another power line transmitting the second power voltage VSS to the pixel PX to mitigate a voltage drop in the second power voltage VSS.

Likewise, the sensing lines RL1 to RLm may extend in the second direction DR2, and may be arranged in the first direction DR1. The sensing lines RL1 to RLm may be spaced apart from each other by the size of the pixel PX. Each of the sensing lines RL1 to RLm may be coupled to the corresponding pixel PX. For example, the sub-pixels SP1, SP2, and SP3 in the pixel PX may be coupled with the first sensing line RL1.

Similarly to the scan lines SL1 to SLi, the sensing control lines SSL1 to SSLi may extend in the first direction DR1, and may be arranged in the second direction DR2.

The scan driver 120 may further generate a sensing control signal in addition to the scan signal, and may supply the sensing control signal to the sensing lines SSL1 to SSLi.

The timing controller 140 may further generate a compensation driving control signal CCS based on the control signal CS. The compensation driving control signal CCS may be supplied to the compensator 160. The compensation driving control signal CCS may control driving of the compensator 160 for pixel sensing and degradation compensation.

The compensator 160 may detect the characteristic information of the pixel PX based on the sensing values supplied from the sensing lines RL1 to RLm, and may generate a compensation value that compensates for the degradation of the pixel PX based on the characteristic information of the pixel PX.

In an exemplary embodiment, the compensator 160 may receive current or voltage extracted from the pixel PX through the sensing lines RL1 to RLm. The extracted current or voltage may correspond to a sensing value. The compensator 160 may detect a change in threshold voltage (and change in mobility, change in characteristic of the light emitting element, etc.) of the driving transistor based on the sensing value or the variation of the sensing value.

The compensator 160 may calculate the compensation value for the image data DATA2 or the data signal (or data voltage) corresponding thereto, based on the detected characteristic information. The compensation value may be supplied to the timing controller 140 or the data driver 130.

In an exemplary embodiment, the compensation value (or the characteristic information, the sensing value for the threshold voltage change) may be supplied to the light stress compensator 150. The light stress compensator 150 may vary a reference value for a corresponding sub-pixel (i.e., a reference for determining whether the corresponding sub-pixel emits light) based on the compensation value. For example, when the threshold voltage of the first sub-pixel SP1 is negatively shifted, the first reference value of the first sub-pixel SP1 may be increased.

Although FIG. 1B illustrates that the compensator 160 is a separate component, the compensator 160 may be incorporated in the data driver 130.

Figure 2A:
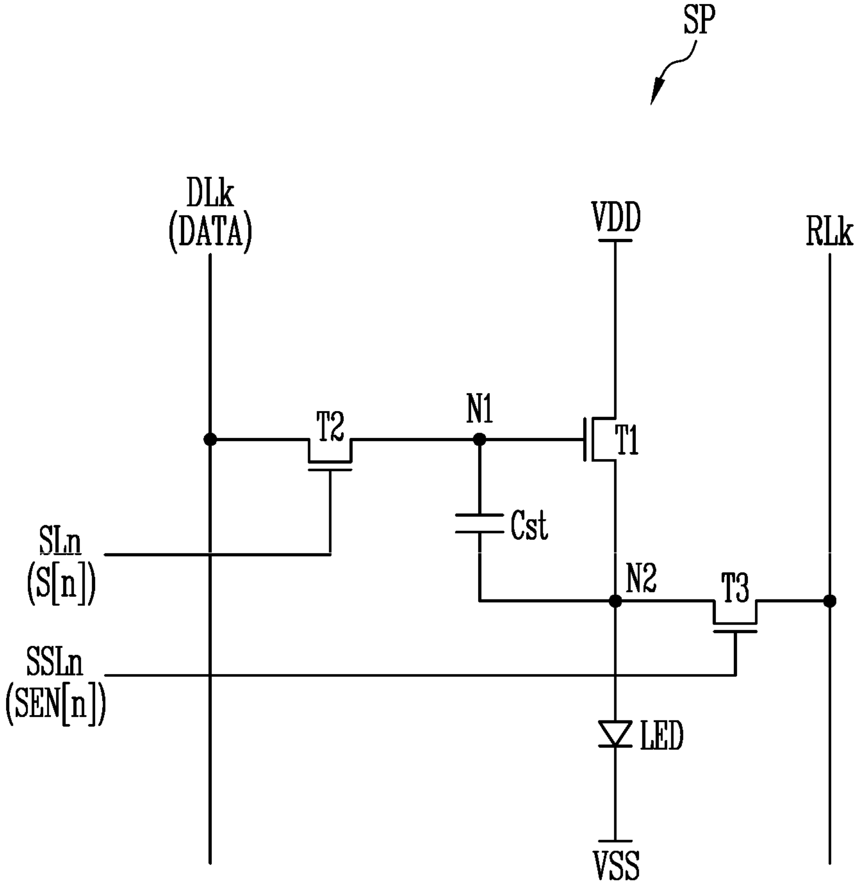
FIG. 2A is a circuit diagram illustrating an example of a sub-pixel included in the display device of FIG. 1B.

FIG. 2A is a circuit diagram illustrating an example of the sub-pixel included in the display device of FIG. 1B. Since the sub-pixels SP1, SP2, and SP3 illustrated in FIG. 1B are substantially equal or similar to each other, the sub-pixels SP1, SP2, and SP3 will be collectively described as the sub-pixel SP.

Referring to FIG. 2A, the sub-pixel SP may be coupled to an n-th scan line SLn, a k-th data line DLk, an n-th sensing control line SSLn and a k-th sensing line RLk (n and k are positive integers).

The sub-pixel SP may include a light emitting element LED, a first transistor (driving transistor) T1, a second transistor (switching transistor) T2, a third transistor (sensing transistor) T3, and a storage capacitor Cst. Each of the first transistor T1, the second transistor T2 and the third transistor T3 may be a thin film transistor including an oxide semiconductor.

An anode electrode of the light emitting element LED may be coupled to a second electrode of a second node N2 (or the first transistor T1), while a cathode electrode may be coupled to a second power line to which the second power voltage VSS is applied. The light emitting element LED may emit light having a set or predetermined luminance corresponding to current supplied from the first transistor T1. The light emitting element LED may be implemented as an organic light emitting diode, but is not limited thereto. That is, this may include an inorganic light emitting diode.

The first electrode of the first transistor T1 may be coupled to the first power line to which the first power voltage VDD is applied, and the second electrode may be coupled to the second node N2 (or the anode electrode of the light emitting element LED). A gate electrode of the first transistor T1 may be coupled to the first node N1. The first transistor T1 controls the amount of current flowing to the light emitting element LED in response to the voltage of the first node N1.

A first electrode of the second transistor T2 may be coupled to the k-th data line DLk, and a second electrode thereof may be coupled to the first node N1. A gate electrode of the second transistor T2 may be coupled to the n-th scan line SLn. When a scan signal S[n] is supplied to the n-th scan line SLn, the second transistor T2 may be turned on to transmit a data signal (or data voltage) DATA from the k-th data line DLk to the first node N1.

The storage capacitor Cst may be coupled between the first node N1 and the anode electrode of the light emitting element LED. The storage capacitor Cst may store the voltage of the first node N1.

The third transistor T3 may be coupled between the k-th sensing line RLk and the second node N2 (or the second electrode of the first transistor T1). The third transistor T3 may transmit sensing current to the k-th sensing line RLk in response to a sensing signal SEN[n]. The sensing current may be provided to the compensator 160. For example, the sensing current may be used to calculate variation of the threshold voltage (and mobility) of the first transistor T1. Information about the mobility and the threshold voltage may be calculated based on relationship between the sensing current and a voltage for sensing. In an exemplary embodiment, the sensing current may be converted into the form of a voltage and thus used for a compensation operation.

In the exemplary embodiment of the present invention, the sub-pixel SP is not limited to the circuit structure illustrated in FIG. 2A.

Figure 2B:
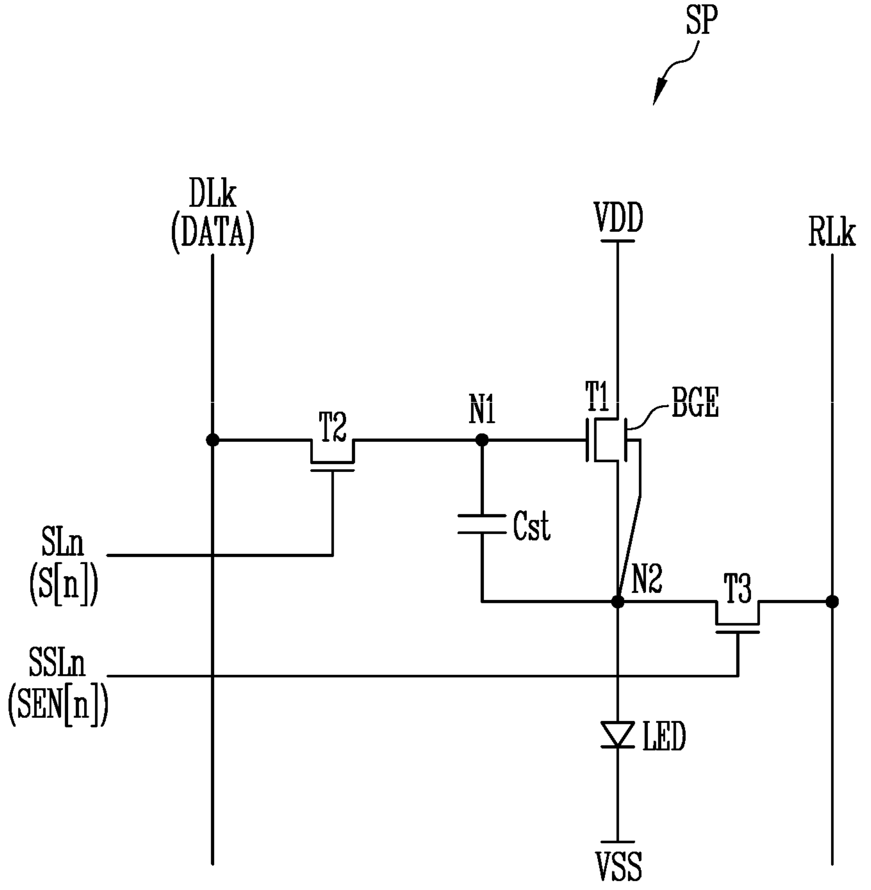
FIG. 2B is a circuit diagram illustrating another example of the sub-pixel included in the display device of FIG. 1B.

FIG. 2B is a circuit diagram illustrating another example of the sub-pixel included in the display device of FIG. 1B.

Referring to FIGS. 2A and 2B, the sub-pixel SP of FIG. 2B may be substantially equal to the sub-pixel SP of FIG. 2A except that the first transistor T1 includes a back-gate electrode BGE. Thus, a duplicated description will not be repeated herein.

The back-gate electrode BGE of the first transistor T1 may be coupled to the second node N2. The back-gate electrode BGE may be disposed to overlap the gate electrode with an insulating layer interposed therebetween, may form a body of the first transistor T1, and may function as the gate electrode. That is, the first transistor T1 may be implemented as a back-gate transistor (or a dual-gate transistor) that further includes the back-gate electrode.

As the back-gate electrode BGE of the first transistor T1 is coupled to the second node N2, while the sub-pixel SP emits light, a change in voltage of the second electrode (or the second transistor electrode, for instance, the source electrode) of the first transistor T1 may be transmitted to a change in voltage of the gate electrode, a voltage (e.g., a gate-source voltage) between the first electrode of the first transistor T1 and the gate electrode may be maintained, and the pixel PX may emit light at a desired luminance.

In addition, when the back-gate electrode BGE of the first transistor T1 is disposed on a semiconductor layer of the first transistor T1, the back-gate electrode may mitigate a change in characteristics of the first transistor T1 caused by light. The back-gate electrode will be described below with reference to FIGS. 4A and 5C.

Figure 3:
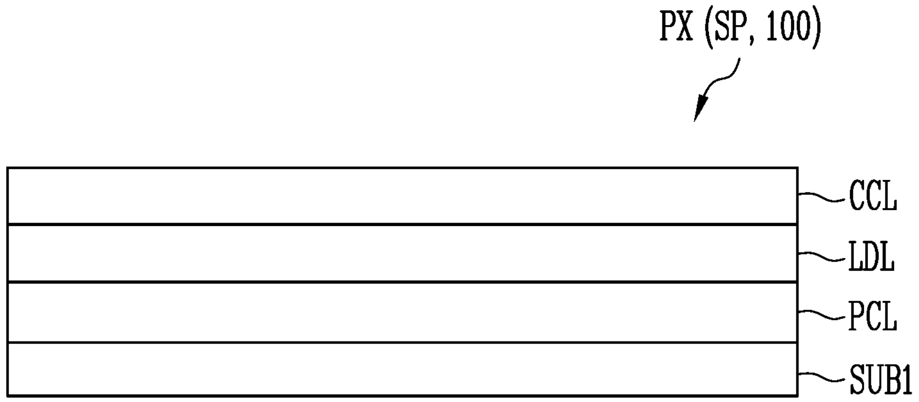
FIG. 3 is a sectional view illustrating an example of the pixel included in the display device of FIG. 1B.

FIG. 3 is a sectional view illustrating an example of the pixel included in the display device of FIG. 1B.

Referring to FIGS. 1B and 3, the pixel PX (or the sub-pixel SP, the display device 100) may include a first substrate SUB1, a pixel circuit layer PCL, a light-emitting-element layer LDL, and a light conversion layer CCL.

The first substrate SUB1 may be made of insulating material such as glass or resin. The first substrate SUB1 may be made of material having flexibility so as to be bendable or foldable, and have a single- or multi-layer structure.

For instance, examples of the material having flexibility may include at least one of the following: polystyrene, polyvinyl alcohol, polymethyl methacrylate, polyethersulfone, polyacrylate, polyetherimide, polyethylene naphthalate, polyethylene terephthalate, polyphenylene sulfide, polyarylate, polyimide, polycarbonate, triacetate cellulose, and cellulose acetate propionate. However, the material forming the first substrate SUB1 is not limited thereto. For example, the first substrate SUB1 may be made of fiber reinforced plastic (FRP) or the like.

The pixel circuit layer PCL may be disposed on the first substrate SUB1, and may include the transistors T1, T2 and T3, the storage capacitor Cst, and wires SLn, DLk, SSLn and RLk, which are described with reference to FIGS. 2A and 2B.

The light-emitting-element layer LDL may be disposed on the pixel circuit layer PCL, and may include the light emitting element LED described with reference to FIGS. 2A and 2B.

The light conversion layer CCL may be disposed on the light-emitting-element layer LDL. The light conversion layer CCL may include light conversion particles that convert light of a specific color (or a specific wavelength) into light of a different color, and a color filter that selectively transmits light of a specific color.

Figure 4A:
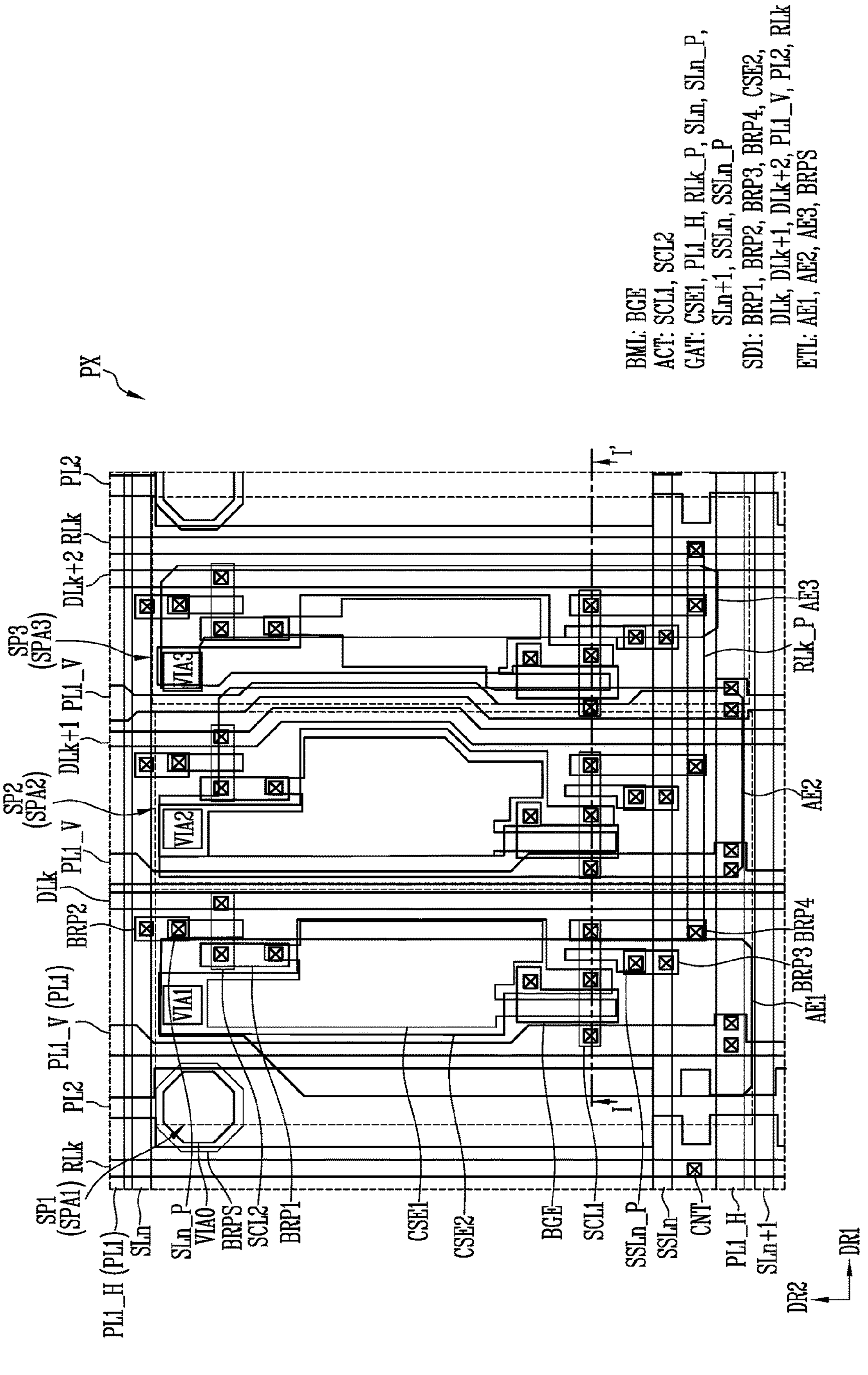
FIG. 4A is a layout illustrating an example of a pixel circuit layer included in the pixel of FIG. 3.
Figure 4B:
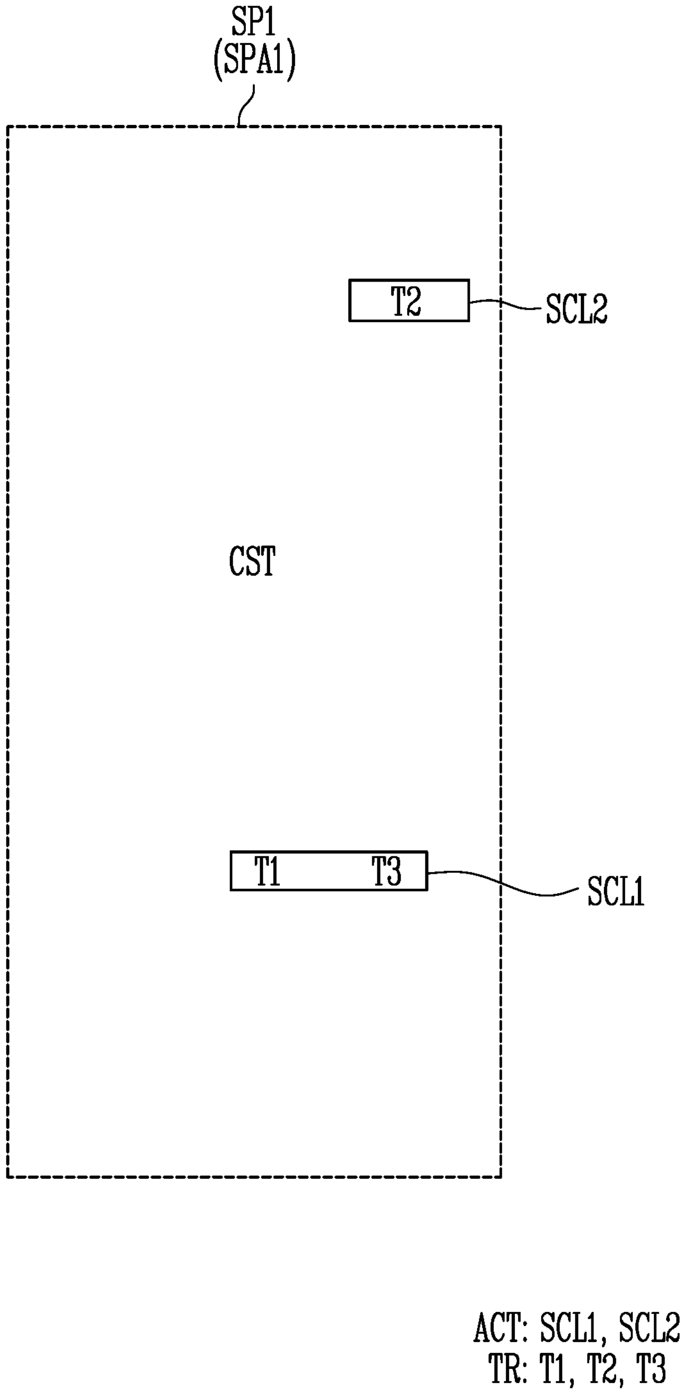
FIG. 4B is a diagram illustrating an example of a semiconductor layer included in the pixel circuit layer of FIG. 4A.
Figure 4C:
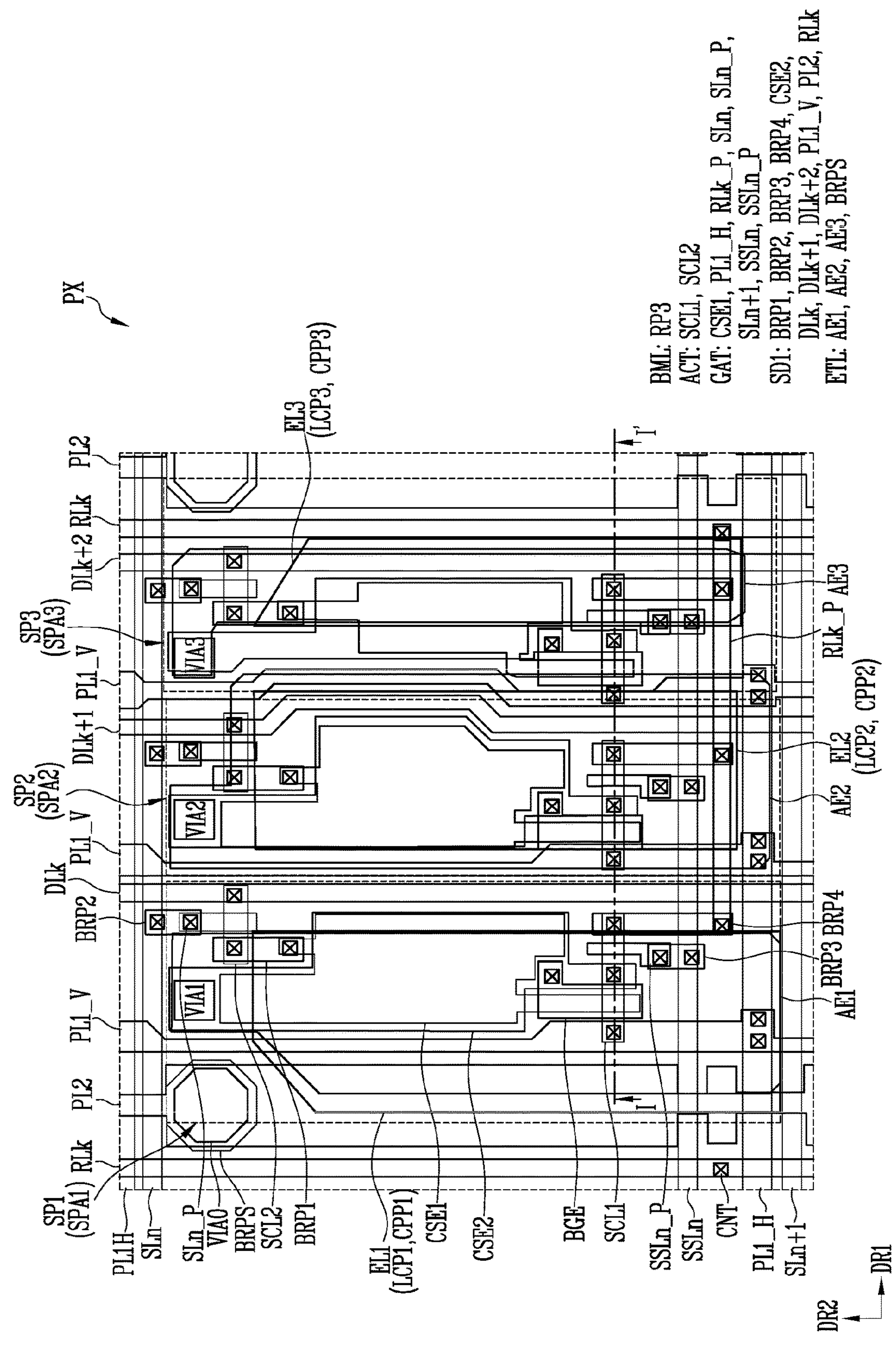
FIG. 4C is a layout illustrating an example of a light-emitting-element layer included in the pixel of FIG. 3.
Figure 5A:
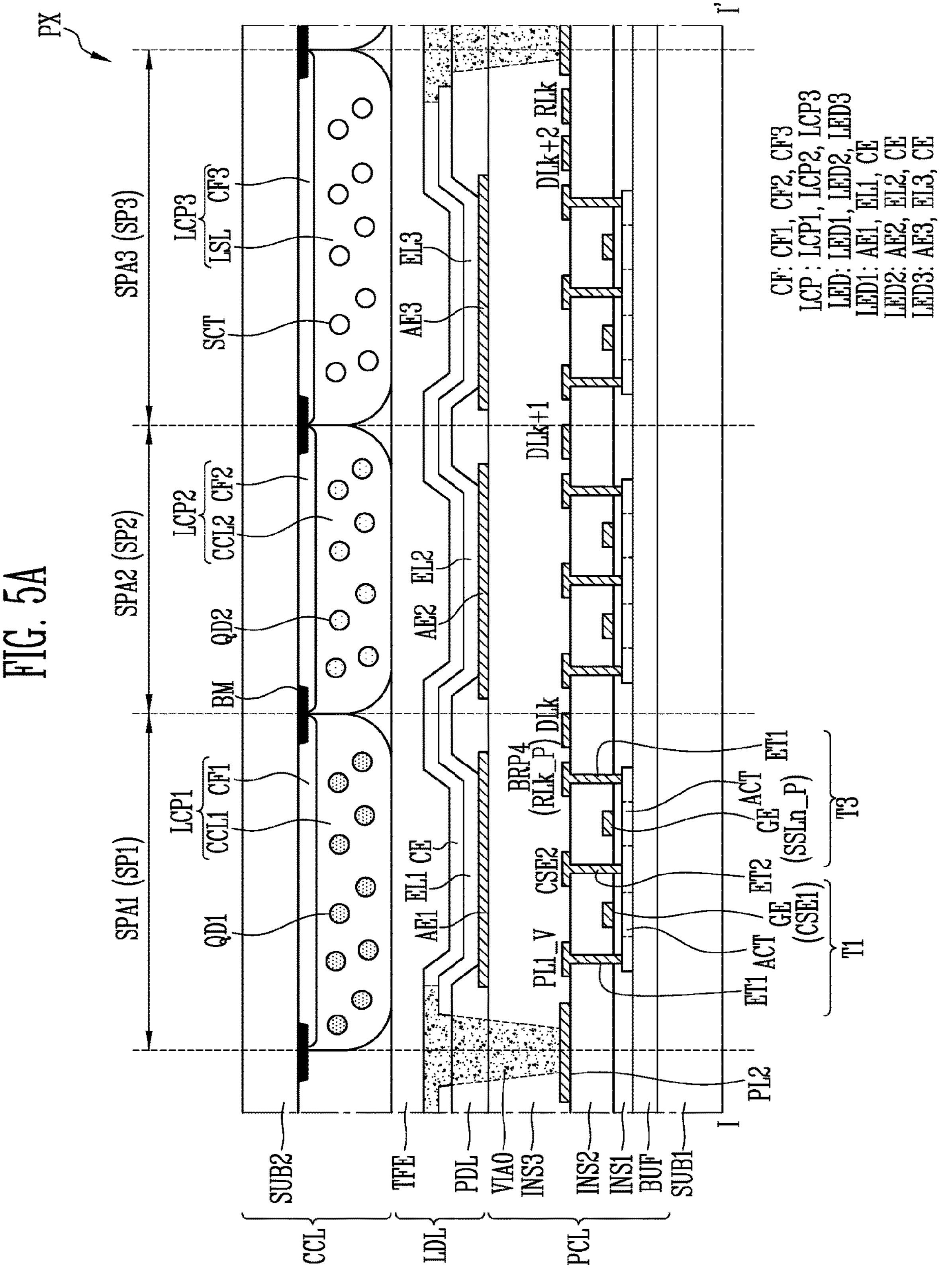
FIGS. 5A-5B are sectional views illustrating an example of the pixel taken along the line I-I' of FIG. 4A.
Figure 5B:
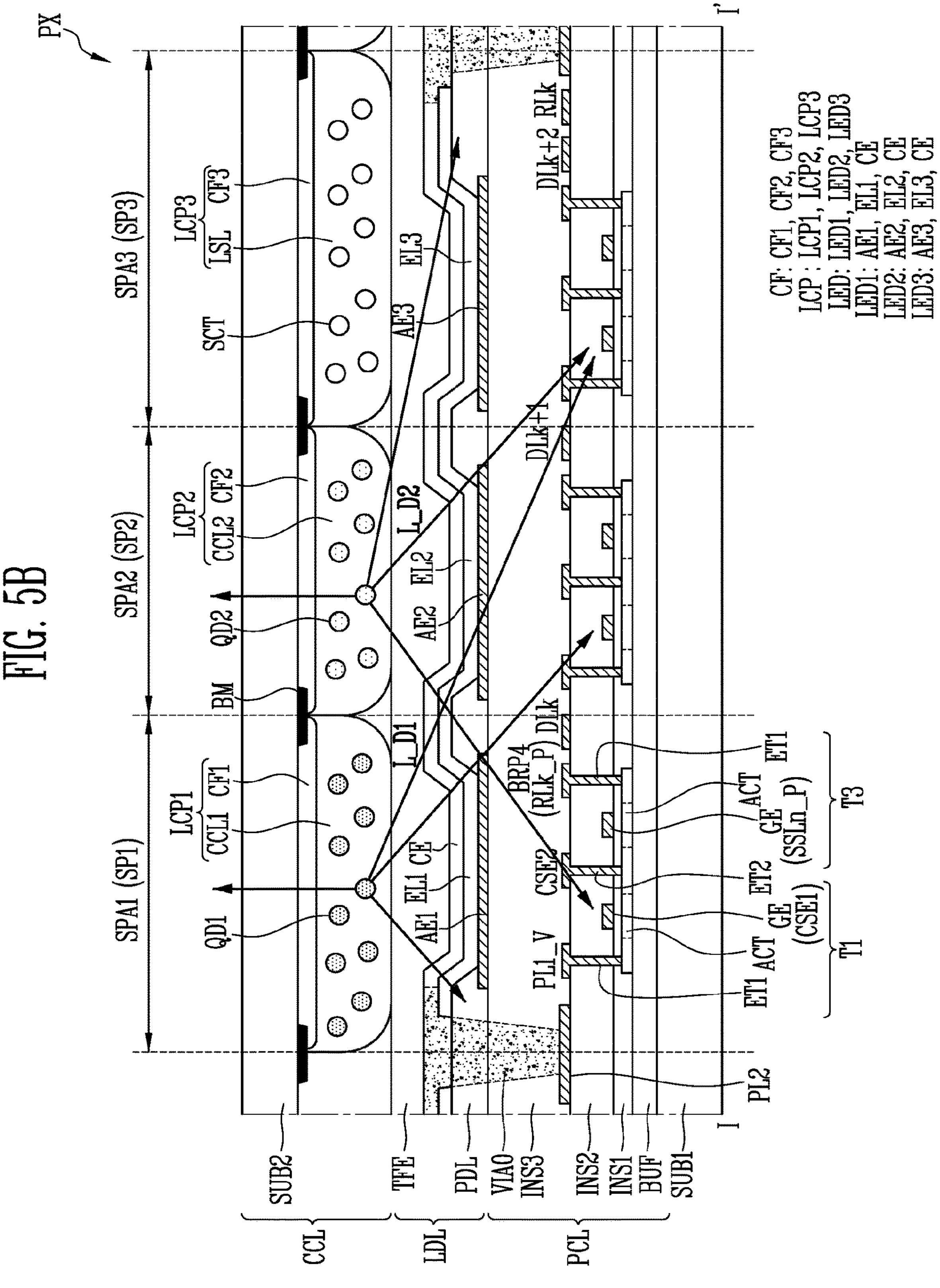
Figure 5C:
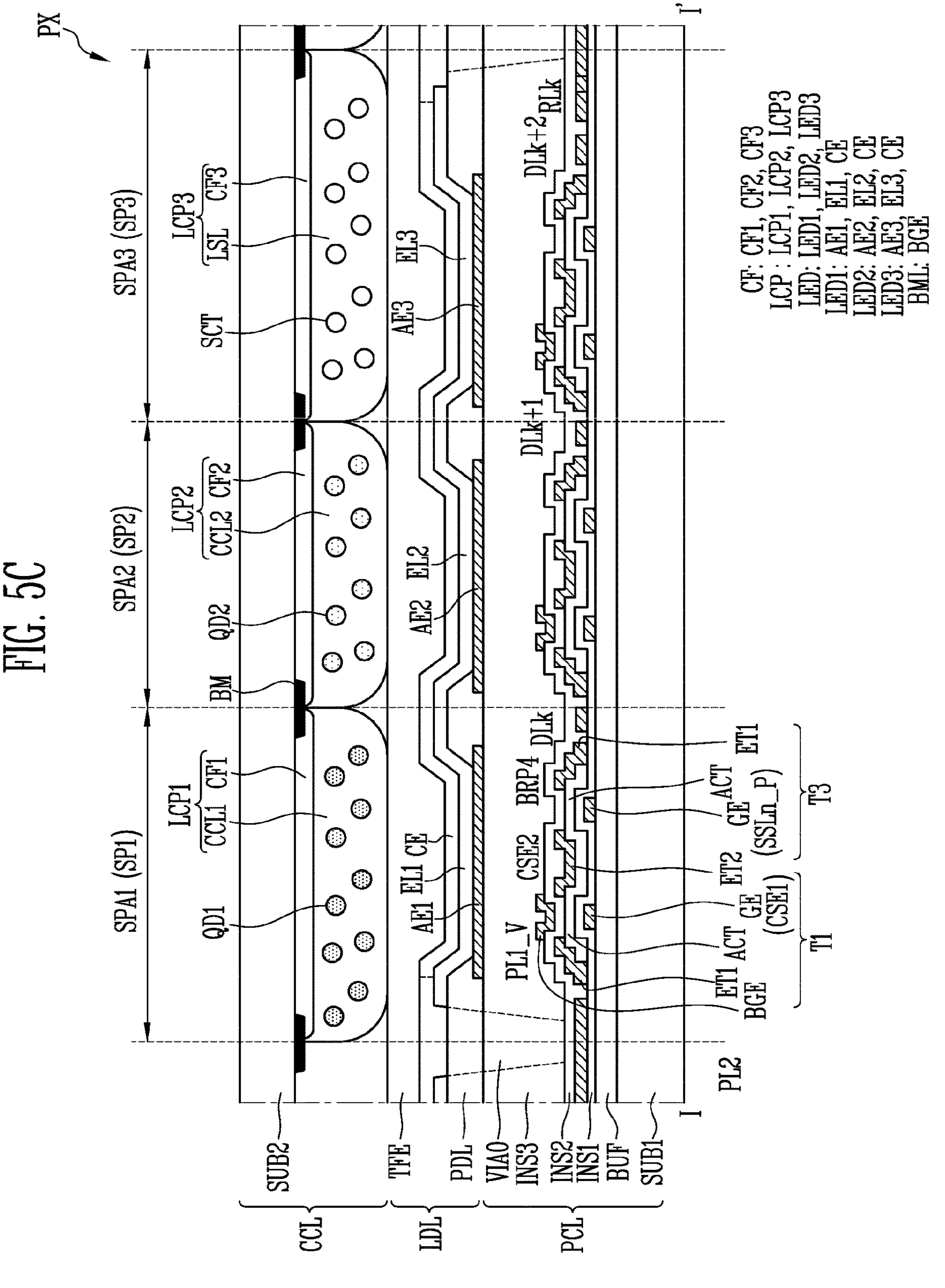
FIG. 5C is a sectional view illustrating another example of the pixel taken along the line I-I' of FIG. 4A.

FIG. 4A is a layout illustrating an example of the pixel circuit layer included in the pixel of FIG. 3. FIG. 4B is a diagram illustrating an example of the semiconductor layer included in the pixel circuit layer of FIG. 4A. FIG. 4C is a layout illustrating an example of the light-emitting-element layer included in the pixel of FIG. 3. FIGS. 5A and 5B are sectional views illustrating an example of the pixel taken along the line I-I' of FIG. 4A. FIG. 5C is a sectional view illustrating another example of the pixel taken along the line I-I' of FIG. 4A.

Since the first sub-pixel SP1, the second sub-pixel SP2 and the third sub-pixel SP3 have a substantially equal or similar structure, the present invention will be mainly described with the first sub-pixel SP1.

First, referring to FIGS. 1B, 3, 4A and 5A, the pixel circuit layer PCL may include a buffer layer BUF, a semiconductor layer ACT, a first insulating layer INS1, a first conductive layer GAT, a second insulating layer INS2, a second conductive layer SD1, and a third insulating layer INS3. As illustrated in FIG. 5A, the buffer layer BUF, the semiconductor layer ACT, the first insulating layer INS1, the first conductive layer GAT, the second insulating layer INS2, the second conductive layer SD1, and the third insulating layer INS3 may be sequentially stacked on the first substrate SUB1.

The buffer layer BUF may be disposed on the entire surface of the first substrate SUB1. The buffer layer BUF may prevent or substantially prevent impurity ions from being diffused, prevent or substantially prevent water or outside air from being penetrated, and perform a surface planarization function. The buffer layer BUF may include silicon nitride, silicon oxide, silicon oxynitride, and/or the like. The buffer layer BUF may be eliminated depending on the type of the first substrate SUB1 or process conditions.

The semiconductor layer ACT may be disposed on the buffer layer BUF (or the first substrate SUB1). The semiconductor layer ACT may be an active layer forming a channel of the transistor TR. The semiconductor layer ACT may include a source area and a drain area which are in contact with a first transistor electrode ET1 (or a source electrode) and a second transistor electrode ET2 (or a drain electrode). An area between the source area and the drain area may be a channel area.

As illustrated in FIG. 4B, the semiconductor layer ACT may include a first semiconductor pattern SCL1 and a second semiconductor pattern SCL2. The first semiconductor pattern SCL1 may be disposed on an upper side of the first sub-pixel SP1 (or the first sub-pixel area SPA1 on which the first sub-pixel SP1 is formed) on a plane, and may form the channel of the first transistor T1 and the third transistor T3.

The second semiconductor pattern SCL2 may be spaced apart from the first semiconductor pattern SCL1, may be disposed on a lower side of the first sub-pixel SP1 (or the first sub-pixel area SPA1) on a plane, and may form the channel of the second transistor T2.

The semiconductor layer ACT may include an oxide semiconductor. The channel area of the semiconductor pattern may be a semiconductor pattern which is not doped with impurities, and may be an intrinsic semiconductor. Each of the source area and the drain area may be an impurity-doped semiconductor pattern. As the impurities, n-type impurities may be used.

Referring back to FIG. 5A, the first insulating layer INS1 (or the gate insulating layer) may be disposed on the semiconductor layer ACT and the buffer layer BUF (or the first substrate SUB1). The first insulating layer INS1 may be generally disposed throughout an entire surface of the first substrate SUB1. The first insulating layer INS1 may be a gate insulating film having a gate insulating function.

The first insulating layer INS1 may include inorganic insulating material such as a silicon compound or metal oxide. For example, the first insulating layer INS1 may include silicon oxide, silicon nitride, silicon oxynitride, aluminum oxide, tantalum oxide, hafnium oxide, zirconium oxide, titanium oxide, or combinations thereof. The first insulating layer INS1 may be a single-layered film or a multi-layered film composed of a laminated film made of different materials.

The first conductive layer GAT may be disposed on the first insulating layer INS1. The first conductive layer GAT may include a first capacitor electrode CSE1, a first horizontal power line PL1_H, a k-th sensing conductive pattern RLk_P (or, a readout pattern), an n-th scan line SLn, an n-th scan conductive pattern SLn_P, an n+1-th scan line SLn+1, an n-th sensing control line SSLn, and an n-th sensing control conductive pattern SSLn_P (or a sensing pattern).

As illustrated in FIG. 4A, the first capacitor electrode CSE1 may be disposed between the first semiconductor pattern SCL1 and the second semiconductor pattern SCL2 on a plane, and may be generally located at the center of the first sub-pixel area SPA1.

The first capacitor electrode CSE1 of the first sub-pixel SP1, the first capacitor electrode CSE1 of the second sub-pixel SP1, and the first capacitor electrode CSE1 of the third sub-pixel SP3 may have different areas. For example, the first capacitor electrode CSE1 of the first sub-pixel SP1 may have the largest area, and the first capacitor electrode CSE1 of the third sub-pixel SP3 may have the smallest area.

A portion of the first capacitor electrode CSE1 may protrude in the second direction DR2, and may overlap with the first semiconductor pattern SCL1 (or some area forming the first transistor T1 of the first semiconductor pattern SCL1). A portion of the first capacitor electrode CSE1 may form the gate electrode of the first transistor T1.

The first horizontal power line PL1_H may extend in the first direction DR1 to a different sub-pixel area (e.g., the second sub-pixel area SPA2 and the third sub-pixel area SPA3), and may be disposed on the upper side (lower side) of the first sub-pixel area SPA1. Although will be described later, the first horizontal power line PL1_H may be coupled to the first vertical power line PL1V of the second conductive layer SD1 to form the first power line PL1 of a mesh structure.

The k-th sensing conductive pattern RLk_P may extend in the first direction DR1, and may be disposed throughout the first to third sub-pixel areas SPA1, SPA2 and SPA3. The k-th sensing conductive pattern RLk_P may be disposed on the lower side of the n-th sensing control line SSLn on a plane; however, embodiments of the present invention are not limited thereto.

The n-th scan line SLn may extend in the first direction DR1 to a different sub-pixel area (e.g., the second sub-pixel area SPA2 and the third sub-pixel area SPA3). The n-th scan line SLn may be disposed between the first horizontal power line PL1_H and the second semiconductor pattern SCL2 on a plane.

The n-th scan conductive pattern SLn_P may overlap with the second semiconductor pattern SCL2, and may form the gate electrode of the second transistor T2. The n-th scan conductive pattern SLn_P may be coupled to the n-th scan line SLn through a second bridge pattern BRP2 of the second conductive layer SD1 that will be described later. However, without being limited thereto, the n-th scan conductive pattern SLn_P may protrude from the n-th scan line SLn, and may be formed integrally with the n-th scan line SLn.

Since the n+1-th scan line SLn+1 is substantially equal to the n-th scan line SLn, a duplicated description thereof is not repeated herein.

The n-th sensing control line SSLn may extend in the first direction DR1 to a different sub-pixel area (e.g., the second sub-pixel area SPA2 and the third sub-pixel area SPA3). The n-th sensing control line SSLn may be disposed between the first semiconductor pattern SCL1 and the first horizontal power line PL1_H on a plane.

The n-th sensing control conductive pattern SSLn_P may be disposed to overlap with the first semiconductor pattern SCL1 (or some area forming the third transistor T3 of the first semiconductor pattern SCL1). The n-th sensing control conductive pattern SSLn_P may be coupled to the n-th sensing control line SSLn through a third bridge pattern BRP3 of the second conductive layer SD1 that will be described later. However, without being limited thereto, the n-th sensing control conductive pattern SSLn_P may protrude from the n-th sensing control line SSLn, and may be formed integrally with the n-th sensing control line SSLn.

The first conductive layer GAT may include at least one metal selected from molybdenum (Mo), aluminum (Al), platinum (Pt), palladium (Pd), silver (Ag), magnesium (Mg), gold (Au), nickel (Ni), neodymium (Nd), iridium (Ir), chrome (Cr), titanium (Ti), tantalum (Ta), tungsten (W), and copper (Cu). The first conductive layer GAT may have a single- or multi-layered film structure.

Referring back to FIG. 5A, the second insulating layer INS2 (or an interlayer insulating layer) may be disposed on the first conductive layer GAT, and may be generally disposed throughout an entire surface of the first substrate SUB1. The second insulating layer INS2 may serve to insulate the first conductive layer GAT from the second conductive layer SD1, and may be an interlayer insulating film.

The second insulating layer INS2 may include an inorganic insulating material such as silicon oxide, silicon nitride, silicon oxynitride, hafnium oxide, aluminum oxide, titanium oxide, tantalum oxide or zirconium oxide, or an organic insulating material such as polyacrylates resin, epoxy resin, phenolic resin, polyamides resin, polyimides resin, unsaturated polyesters resin, polyphenylenethers resin, polyphenylenesulfides resin or benzocyclobutene (BCB). The second insulating layer INS2 may be a single-layered film or a multi-layered film composed of a laminated film made of different materials.

The second conductive layer SD1 may be disposed on the second insulating layer INS2. The second conductive layer SD1 may include a second capacitor electrode CSE2, a k-th data line DLk, a k+1-th data line DLk+1, a k+2-th data line DLk+2, a first vertical power line PL1_V, a second power line PL2, and first to fourth bridge patterns BRP1, BRP2, BRP3, and BRP4.

The second capacitor electrode CSE2 may be disposed to overlap with the first capacitor electrode CSE1, and may have an area larger than that of the first capacitor electrode CSE1. A portion of the second capacitor electrode CSE2 may extend in the second direction DR2, may overlap with some area of the first semiconductor pattern SCL1 (e.g., the source area of the first transistor T1 and the source area of the third transistor T3), and may be coupled to some area of the first semiconductor pattern SCL1 exposed through a contact hole (or a contact opening) CNT. A portion of the first capacitor electrode CSE1 may constitute a second transistor electrode ET2 of each of the first transistor T1 and the third transistor T3.

The k-th data line DLk may extend in the second direction DR2, and may be disposed at a side of the first sub-pixel area SPA1. The k-th data line DLk may overlap with some area of the second semiconductor pattern SCL2 (or, the source area of the second transistor T2), and may be coupled with some area of the second semiconductor pattern SCL2 exposed through the contact hole CNT. The k-th data line DLk may form the first transistor electrode ET1 of the second transistor T2.

Since the k+1-th data line DLk+1 and the k+2-th data line DLk+2 are substantially equal or similar to the k-th data line DLk, a duplicated description thereof will not be repeated herein.

A portion of the k+1-th data line DLk+1 may include a part that is bent by avoiding the second capacitor electrode CSE2, but the present invention is not limited thereto.

The first vertical power line PL1_V may extend in the second direction DR2, and may be repetitively arranged in the first direction DR1. The first vertical power line PL1_V may overlap with some area of the first semiconductor pattern SCL1 (or, the drain area of the first transistor T1), and may be coupled with some area of the first semiconductor pattern SCL1 exposed through the contact hole CNT. The first vertical power line PL1_V may form the first transistor electrode ET1 of the first transistor T1.

In addition, the first vertical power line PL1_V may overlap with the first horizontal power line PL1_H of the first conductive layer GAT, and may be coupled to the first horizontal power line PL1_H exposed through the contact hole CNT. As described above, the first vertical power line PL1_V and the first horizontal power line PL1_H may constitute the first power line PL1 of a mesh structure, and may mitigate a drop of the first power voltage VDD applied to the first power line PL1.

The second power line PL2 may extend in the second direction DR2, and may be repetitively arranged on the basis of the pixel PX in the first direction DR1. A width of the second power line PL2 is larger than a width of the first vertical power line PL1_V and a width of the k-th data line DLk. For example, the second power line PL2 may be about 3 to 6 times as wide as the first vertical power line PL1_V. The second power line PL2 may be coupled to the cathode electrode of the light emitting element LED through a reference via VIA0 (or a via hole) that will be described later.

The second power line PL2 may be disposed on a side of the pixel PX to prevent or substantially prevent a parasitic capacitor from being formed in relation to other wires, and may have a relatively large width to prevent or substantially reduce a drop of the second power voltage VSS applied to the cathode electrode of the light emitting element LED.

The second power line PL2 may have a relatively narrow width in some area overlapping with the n-th scan line SLn and the n-th sensing control line SSLn. In this case, the loads of the n-th scan line SLn and the n-th sensing control line SSLn may be relatively reduced.

The first bridge pattern BRP1 may extend in the second direction DR2, may overlap with some area of the second semiconductor pattern SCL2 (or, the drain area of the second transistor T2), and may be coupled with some area of the second semiconductor pattern SCL2 exposed through the contact hole CNT. The first bridge pattern BRP1 may form the second transistor electrode ET2 of the second transistor T2.

In addition, the first bridge pattern BRP1 may overlap with the first capacitor electrode CSE1, and may be coupled to the first capacitor electrode CSE1 exposed through the contact hole CNT.

The second bridge pattern BRP2 may extend in the second direction DR2, may overlap with each of the n-th scan line SLn and the n-th scan pattern SLn_P, and may be coupled to each of the n-th scan line SLn and the n-th scan pattern SLn_P through the contact hole CNT. The second bridge pattern BRP2 may be coupled to each of the n-th scan line SLn and the n-th scan pattern SLn_P. When the n-th scan line SLn and the n-th scan pattern SLn_P are integrally formed, the second bridge pattern BRP2 may be omitted.

The third bridge pattern BRP3 may extend in the second direction DR2, may overlap with each of the n-th sensing control line SSLn and the n-th sensing control conductive pattern SSLn_P, and may be coupled to each of the n-th sensing control line SSLn and the n-th sensing control conductive pattern SSLn_P through the contact hole CNT. The third bridge pattern BRP3 may be coupled to each of the n-th sensing control line SSLn and the n-th sensing control conductive pattern SSLn_P. When the n-th sensing control line SSLn and the n-th sensing control conductive pattern SSLn_P are integrally formed, the third bridge pattern BRP3 may be omitted.

The fourth bridge pattern BRP4 may extend in the second direction DR2, may overlap with some area of the first semiconductor pattern SCL1 (or, the source area of the third transistor T3), and may be coupled to some area of the first semiconductor pattern SCL1 exposed through the contact hole CNT. The fourth bridge pattern BRP4 may form the first transistor electrode ET1 of the third transistor T3.

In addition, the fourth bridge pattern BRP4 may overlap with the k-th sensing conductive pattern RLk_P, and may be coupled to the k-th sensing conductive pattern RLk_P exposed through the contact hole CNT.

Similarly to the first conductive layer GAT, the second conductive layer SD1 may include at least one metal selected from molybdenum (Mo), aluminum (Al), platinum (Pt), palladium (Pd), silver (Ag), magnesium (Mg), gold (Au), nickel (Ni), neodymium (Nd), iridium (Ir), chrome (Cr), titanium (Ti), tantalum (Ta), tungsten (W), and copper (Cu). The second conductive layer SD1 may have a single- or multi-layered film structure.

Referring back to FIG. 5A, the third insulating layer INS3 (or a passivation layer) may be located on the second conductive layer SD1.

The light-emitting-element layer LDL may be disposed on the pixel circuit layer PCL. The light-emitting-element layer LDL may include the light emitting element LED and an encapsulation layer TFE. In addition, the light-emitting-element layer LDL may further include a bridge electrode BRPS.

The light emitting element LED may be disposed on the third insulating layer INS3.

The light emitting element LED may include anode electrodes AE1, AE2 and AE3 (or a lower electrode), a cathode electrode CE (or an upper electrode), and light emitting layers EL1, EL2 and EL3 (or an intermediate layer). In addition, the light emitting element LED may further include a pixel defining layer PDL.

Since the first light emitting element LED1, the second light emitting element LED2, and the third light emitting element LED3 are substantially equal or similar to each other, the present invention will be mainly described with the first light emitting element LED1.

The first light emitting element LED1 may include a first anode electrode AE1, a cathode electrode CE, and a first light emitting layer EL1. The second light emitting element LED2 may include a second anode electrode AE2, a cathode electrode CE, and a second light emitting layer EL2. The third light emitting element LED3 may include a third anode electrode AE3, a cathode electrode CE, and a third light emitting layer EL3.

As illustrated in FIG. 4C, the first anode electrode AE1 may be disposed to cover most of the first sub-pixel area SPA1, and may overlap with a first via VIA1. Similarly, the second anode electrode AE2 may be disposed to cover most of the second sub-pixel area SPA2, may overlap with a second via VIA2, and may have an area larger than that of the first anode electrode AE1. The third anode electrode AE3 may be disposed to cover most of the third sub-pixel area SPA3, may overlap with a third via VIA3, and may have an area smaller than that of the first anode electrode AE1.

The first anode electrode AE1 may be coupled to the second capacitor electrode CSE2 through the first via VIA1 (or the first via hole) passing through the third insulating layer INS3, and may be electrically coupled to the second transistor electrode ET2 of the first transistor T1 through the second capacitor electrode CSE2.

Referring back to FIG. 5A, the pixel defining layer PDL may be disposed along an edge of the first anode electrode AE1, and the pixel defining layer PDL may include an organic insulating material.

The first light emitting layer EL1 may be disposed on the first anode electrode AE1 exposed by the pixel defining layer PDL. The first light emitting layer EL1 may include a low molecular material or a high molecular material.

The cathode electrode CE may be disposed on the first light emitting layer EL1. The cathode electrode CE may be a common electrode that is entirely formed on the light emitting layers EL1, EL2 and EL3 and the pixel defining layer PDL. The cathode electrode CE may be a transparent or translucent electrode.

The bridge electrode BRPS may be disposed on the same layer as the anode electrodes AE1, AE2 and AE3 or may be formed through the same process as the anode electrodes. The bridge electrode BRPS may overlap with the second power line PL2, and may be coupled to the second power line PL2 exposed through a reference via VIA0. In addition, the bridge electrode BRPS may be partially exposed by the pixel defining layer PDL, and may be coupled to the cathode electrode CE. However, this invention is not limited thereto, and the bridge electrode BRPS may be omitted and the cathode electrode CE may be directly coupled to the second power line PL2 through the reference via VIA0. The reference via VIA0 may be formed through laser drilling after the pixel defining layer PDL is formed.

The encapsulation layer TFE may be disposed on the cathode electrode CE. The encapsulation layer TFE may prevent or substantially prevent water and air, which may be introduced from the outside, from penetrating the light emitting element LED. The encapsulation layer TFE may be formed of a thin film encapsulation, and may include at least one organic film and at least one inorganic film. For example, the organic film may be made of any one selected from a group consisting of epoxy, acrylate or urethane acrylate. The inorganic film may be made of any one selected from a group consisting of silicon oxide ($SiO_x$), Silicon nitride ($SiN_x$), Silicon oxynitride ($SiON_x$).

Although FIGS. 4A to 5B illustrate that the light-emitting-element layer LDL includes an organic light emitting element, the present invention is not limited thereto. For example, the light-emitting-element layer may include an inorganic light emitting element or the like.

The light conversion layer CCL may be disposed on the light-emitting-element layer LDL. The light conversion layer CCL may include a second substrate SUB2 and a light conversion pattern layer LCP.

The second substrate SUB2 may be disposed on the first substrate SUB1 to face the first substrate SUB1. The second substrate SUB2 may form the upper substrate of the display device 100 (e.g., an encapsulation substrate or a thin film encapsulation layer).

The second substrate SUB2 may be a rigid or flexible substrate, and the material or properties thereof are not particularly limited. In addition, the second substrate SUB2 may be made of the same material as the first substrate SUB1, or made of a material different from that of the first substrate SUB1.

According to an exemplary embodiment, the light conversion pattern layer LCP may include a first light conversion pattern layer LCP1 disposed to face the first sub-pixel SP1, a second light conversion pattern layer LCP2 disposed to face the second sub-pixel SP2, and a third light conversion pattern layer LCP3 disposed to face the third sub-pixel SP3. According to an exemplary embodiment, at least some of the first, second, and third light conversion pattern layers LCP1, LCP2, and LCP3 may include a color filter CF.

For example, the first light conversion pattern layer LCP1 may include a first color conversion layer CCL1 including first color conversion particles corresponding to a first color, and a first color filter CF1 selectively transmitting light of the first color. Likewise, the second light conversion pattern layer LCP2 may include a second color conversion layer CCL2 including second color conversion particles corresponding to a second color, and a second color filter CF2 selectively transmitting light of the second color. The third light conversion pattern layer LCP3 may include at least one of a light scattering layer LSL including light scattering particles SCT, and a third color filter CF3 selectively transmitting light of a third color.

In an exemplary embodiment, the first, second, and third light emitting elements LED1, LED2, and LED3 may emit light of the same color. A color conversion layer may be disposed on an upper portion of at least some of the first, second, and third sub-pixels SP1, SP2, and SP3. For example, the first and second color conversion layers CCL1 and CCL2 may be disposed on upper portions of the first and second sub-pixels SP1 and SP2 respectively. Thus, the display device 100 may display a full color image.

The first color conversion layer CCL1 may be disposed on a surface of the second substrate SUB2 to face the first sub-pixel SP1, and may include first color conversion particles to covert light of a color emitted from the first light emitting element LED1 into light of a first color. For example, in the case where the first light emitting element LED1 is a blue light emitting element for emitting blue light and the first sub-pixel SP1 is a red sub-pixel, the first color conversion layer CCL1 may include red quantum dots QD1, which convert the blue light emitted from the first light emitting element LED1 into red light. For example, the first color conversion layer CCL1 may include a plurality of red quantum dots QD1 which are distributed in a matrix material (e.g., a predetermined matrix material) such as transparent resin. The red quantum dots QD1 may absorb blue light, shift a wavelength by energy transition, and thus emit red light having a wavelength ranging from about 620 nm to 780 nm. In the case where the first sub-pixel SPX1 is a sub-pixel of a different color, the first color conversion layer CCL1 may include first quantum dots having a color corresponding to that of the first sub-pixel SP1.

The first color filter CF1 may be interposed between the first color conversion layer CCL1 and the second substrate SUB2, and may include a color filter material selectively transmitting the light of the first color, which is converted by the first color conversion layer CCL1. For example, when the first color conversion layer CCL1 includes the red quantum dots QD1, the first color filter CF1 may be a red color filter selectively transmitting red light.

The second color conversion layer CCL2 may be disposed on a surface of the second substrate SUB2 to face the second sub-pixel SP2, and may include second color conversion particles to covert light of a color emitted from the second light emitting element LED2 into light of a second color. For example, in the case where the second light emitting element LED2 is a blue light emitting element for emitting blue light and the second sub-pixel SP2 is a green sub-pixel, the second color conversion layer CCL2 may include green quantum dots QD2, which convert the blue light emitted from the second light emitting element LED2 into green light. For example, the second color conversion layer CCL2 may include a plurality of green quantum dots QD2 which are distributed in a matrix material (e.g., a predetermined matrix material) such as transparent resin. The green quantum dots QD2 may absorb blue light, shift a wavelength by energy transition, and thus emit green light having a wavelength ranging from about 500 nm to 570 nm. In the case where the second sub-pixel SP2 is a sub-pixel of a different color, the second color conversion layer CCL2 may include second quantum dots having a color corresponding to that of the second sub-pixel SP2.

Each of the first and second quantum dots (or red and green quantum dots QD1 and QD2) may be selected from among a group II-VI compound, a group III-V compound, a group IV element, a group IV compound, and a combination thereof.

The group II-VI compound may be selected from the group consisting of: a binary compound selected from the group consisting of CdSe, CdTe, ZnS, ZnSe, ZnTe, ZnO, HgS, HgSe, HgTe, MgSe, MgS, and a mixture thereof; a ternary compound selected from the group consisting of CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS, and a mixture thereof; and a quanternary compound selected from the group consisting of HgZnTeS, CdZnSeS, CdZnSeTe, CdZnSTe, CdHgSeS, CdHgSeTe, CdHgSTe, HgZnSeS, HgZnSeTe, HgZnSTe, and a mixture thereof.

The group III-V compound may be selected from the group consisting of: a binary compound selected from the group consisting of GaN, GaP, GaAs, GaSb, AlN, AlP, AlAs, AlSb, InN, InP, InAs, InSb, and a mixture thereof; a ternary compound selected from the group consisting of GaNP, GaNAs, GaNSb, GaPAs, GaPSb, AlNP, AlNAs, AlNSb, AlPAs, AlPSb, InNP, InNAs, InNSb, InPAs, InPSb, GaAlNP, and a mixture thereof; and a quanternary compound selected from the group consisting of GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb, and a mixture thereof.

The group IV-VI compound may be selected from the group consisting of: a binary compound selected from the group consisting of SnS, SnSe, SnTe, PbS, PbSe, PbTe, and a mixture thereof; a ternary compound selected from the group consisting of SnSeS, SnSeTe, SnSTe, PbSeS, PbSeTe, PbSTe, SnPbS, SnPbSe, SnPbTe, and a mixture thereof; and a quanternary compound selected from the group consisting of SnPbSSe, SnPbSeTe, SnPbSTe, and a mixture thereof. The group IV element may be selected from the group consisting of Si, Ge, and a mixture thereof. The group IV compound may be a binary compound selected from the group consisting of SiC, SiGe, and a mixture thereof.

The first and second quantum dots may have a full width of half maximum (FWHM) of an emission wavelength spectrum of about 45 nm or less, and light emitted through the first and second quantum dots may be emitted in all directions. Therefore, a viewing angle of the display device 100 may be improved (e.g., increased).

Each of the first and second quantum dots may be in the form of a nanoparticle, a nanotube, a nanowire, nanofiber, a planar nanoparticle having a spherical shape, a pyramid shape, a multi-arm shape, or a cubic shape; however, embodiments of the present invention are not limited thereto. In other words, the shapes of the first and second quantum dots may be changed in various ways.

In the display device 100, when blue light having a comparatively short wavelength in a visible area is incident on each of the red and green quantum dots QD1 and QD2, the absorption coefficient of the red and green quantum dots QD1 and QD2 may be increased. Thereby, eventually, the efficiency of light emitted from the first and second sub-pixels SP1 and SP2 may be enhanced, and satisfactory color reproducibility may be secured. In addition, the first, second, and third light emitting elements LED1, LED2, and LED3 respectively disposed in the first, second, and third sub-pixel areas SPA1, SPA2, and SPA3 may have the same color (e.g., blue). Hence, the production efficiency of the display device may be enhanced.

The second color filter CF2 may be interposed between the second color conversion layer CCL2 and the second substrate SUB2, and may include a color filter material selectively transmitting the light of the second color, which is converted by the second color conversion layer CCL2. For example, when the second color conversion layer CCL2 includes the green quantum dots QD2, the second color filter CF2 may be a green color filter selectively transmitting green light.

According to an exemplary embodiment, the light scattering layer LSL may be disposed on a surface of the second substrate SUB2 to face the third sub-pixel SP3. For example, the light scattering layer LSL may be disposed between the third sub-pixel SP3 and the third color filter CF3.

When the third light emitting element LED3 is a blue light emitting element for emitting blue light and the third sub-pixel SP3 is a blue sub-pixel, the light scattering layer LSL may be selectively provided to efficiently use light emitted from the third light emitting element LED3. The light scattering layer LSL may include at least one kind of light scattering particles SCT. For example, the light scattering layer LSL may include light scattering particles SCT such as TiO2 or silica. For example, the light scattering layer LSL may include a plurality of light scattering particles SCT which are distributed in a matrix material (e.g., a predetermined matrix material) such as transparent resin. In the present invention, the material of the light scattering particles SCT is not particularly limited, and the light scattering layer LSL may be formed of various well-known materials. Here, the light scattering particles SCT may be disposed in areas other than the third sub-pixel area SPA3. For example, the light scattering particles SCT may be selectively included in the first color conversion layer CCL1 and/or the second color conversion layer CCL2.

According to an exemplary embodiment, the third color filter CF3 may be disposed on a surface of the second substrate SUB2 to face the third sub-pixel SP3, and may include a color filter material selectively transmitting light of a color emitted from the third light emitting element LED3. For example, when the third light emitting element LED3 is a blue light emitting element for emitting blue light, the third color filter CF3 may be a blue color filter for selectively transmitting blue light.

In an exemplary embodiment, black matrixes BM may be disposed between the first, second, and third color filters CF1, CF2, and CF3.

As the quantum dots QD1 and QD2 shift the wavelength of incident light and emit the light in all directions, some of the light emitted from the quantum dots QD1 and QD2 may be moved to the pixel circuit layer PCL.

Referring to FIG. 5B, some of the first light L_D1 emitted from the red quantum dot QD1 may move to the pixel circuit layer PCL in the second sub-pixel area SPA2, and may be radiated onto the first transistor T1 (or transistor TR) of the second sub-pixel SP2. Even if the gate electrode GE covers a channel area of the first transistor T1, the first light L_D1 may be radiated onto the channel area (or the semiconductor layer ACT) of the first transistor T1 of the second sub-pixel SP2 through reflection by the first conductive layer GAT and the second conductive layer SD1. Likewise, some of the first light L_D1 emitted from the red quantum dots QD1 may be radiated onto the channel area of the first transistor T1 of the third sub-pixel SP3.

Some of the first light L_D1 emitted from the red quantum dots QD1 may be moved to an adjacent pixel (or the sub-pixel in the adjacent pixel), and may be blocked through the second power line PL2 and the reference via VIA0 (and the first horizontal power line PL1_H, the scan lines SLn and SLn+1, etc.). That is, the first light L_D1 (or a change in characteristics of the first transistor T1 caused by the first light L_D1) radiated onto the channel area of the first transistor T1 in the adjacent pixel may be less than the first light L_D1 radiated onto the channel area of the first transistor T1 of the second sub-pixel SP2. Therefore, the display device 100 according to the exemplary embodiments of the present invention may determine the light stress conditions based on the sub-pixels SP1, SP2, and SP3 in one pixel PX.

Likewise, some of the second light L_D2 emitted from the green quantum dot QD2 may move to the pixel circuit layer PCL in the first sub-pixel area SPA1, and may be radiated onto the channel area (or the semiconductor layer ACT) of the first transistor T1 of the first sub-pixel SP1. In addition, some of the second light L_D2 may move to the pixel circuit layer PCL in the third sub-pixel area SPA3, and may be radiated onto the channel area of the first transistor T1 of the third sub-pixel SP3

Although FIGS. 5A and 5B illustrate that the transistor TR is implemented as a transistor of a top-gate structure, the present invention is not limited thereto. For example, the transistor TR may have a bottom-gate structure.

Referring to FIGS. 4A, 5A, and 5C, since the pixel PX of FIG. 5C is substantially equal or similar to the pixel PX of FIG. 5A except for the pixel circuit layer PCL, a duplicated description thereof will not be repeated herein.

The pixel circuit layer PCL may include a buffer layer BUF, a first conductive layer GAT, a semiconductor layer ACT, a first insulating layer INS1, a second conductive layer SD1, a second insulating layer INS2, a third conductive layer BML, and a third insulating layer INS3. As illustrated in FIG. 5C, the buffer layer BUF, the first conductive layer GAT, the semiconductor layer ACT, the first insulating layer INS1, the second conductive layer SD1, the second insulating layer INS2, the third conductive layer BML, and the third insulating layer INS3 may be sequentially stacked on the first substrate SUB1.

Since the buffer layer BUF, the first conductive layer GAT, the semiconductor layer ACT, the first insulating layer INS1, the second conductive layer SD1, the second insulating layer INS2, and the third insulating layer INS3 are substantially equal or similar to the buffer layer BUF, the first conductive layer GAT, the semiconductor layer ACT, the first insulating layer INS1, the second conductive layer SD1, the second insulating layer INS2, and the third insulating layer INS3 that are described with reference to FIG. 5A except for stacked positions thereof, a duplicated description thereof will not be repeated.

The first conductive layer GAT may be disposed on the buffer layer BUF (or the first substrate SUB1).

The first insulating layer INS1 (or the gate insulating layer) may be disposed on the first conductive layer GAT.

The semiconductor layer ACT may be disposed on the first insulating layer INS1. The first semiconductor pattern SCL1 (see, e.g., FIG. 4A) may overlap with the first capacitor electrode CSE1 and the n-th sensing control conductive pattern SSLn_P. The first capacitor electrode CSE1 may constitute the gate electrode of the first transistor T1, and the n-th sensing control conductive pattern SSLn_P may constitute the gate electrode of the third transistor T3.

The second conductive layer SD1 may be disposed on the semiconductor layer ACT.

The first vertical power line PL1_V may be in contact with the first semiconductor pattern SCL1 (see, e.g., FIG. 4A), and may constitute the first transistor electrode ET1 of the first transistor T1. The second capacitor electrode CSE2 may be in contact with the first semiconductor pattern SCL1, and may constitute the second transistor electrode ET2 of each of the first transistor T1 and the third transistor T3. The fourth bridge pattern BRP4 may be in contact with the first semiconductor pattern SCL1, and may constitute the first transistor electrode ET1 of the third transistor T3.

The second insulating layer INS2 may be disposed on the first conductive layer GAT, and may be generally disposed throughout an entire surface of the first substrate SUB1.

The third conductive layer BML may be disposed on the second insulating layer INS2, and may include a back gate electrode BGE. The back gate electrode BGE may overlap with the channel area of the first transistor T1, and may constitute a gate electrode (or the back gate electrode BGE) different from the gate electrode GE of the first transistor T1.

The back gate electrode BGE prevents or substantially prevents the channel area of the first transistor T1 from being directly exposed to light radiated from above, and thus may mitigate the change in characteristics of the first transistor T1 by the first light L_D1, the second light L_D2 or the like, which are described with reference to FIG. 5B.

As described with reference to FIGS. 4A to 5C, as the pixel PX includes the light conversion layer CCL, light emitted from the sub-pixel in the pixel PX may be radiated onto the transistor TR of the adjacent sub-pixel in the corresponding pixel PX. Since the pixel PX (or the display device 100) includes the second power line PL2 disposed on the basis of the pixel PX and coupled to the cathode electrode of the light emitting element LED through the reference via VIA0, the radiation of light emitted from the pixel PX onto the adjacent pixel may be reduced or minimized. Therefore, the display device 100 according to exemplary embodiments of the present invention may determine whether the light stress conditions for the sub-pixels SP1, SP2, and SP3 in one pixel PX are satisfied without considering the adjacent pixel, and may compensate for the light stress considering only the sub-pixels SP1, SP2, and SP3 in the pixel PX. That is, it is possible to reduce or minimize load for determining whether the light stress conditions are satisfied and compensating for the light stress.

Figure 6A:
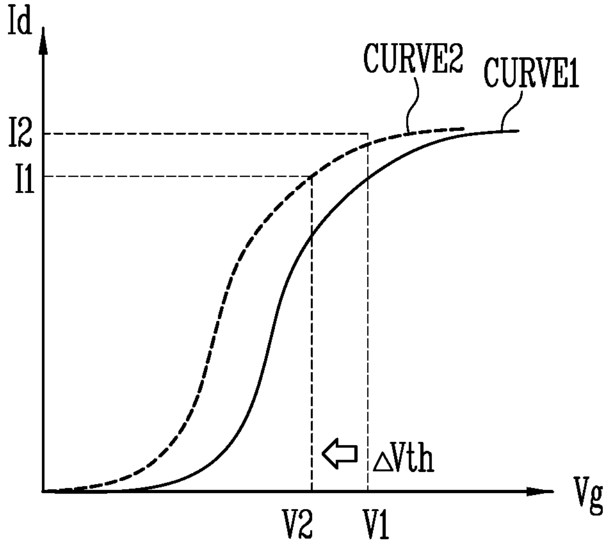
FIG. 6A is a diagram illustrating voltage-current characteristics of a first transistor included in the pixel of FIG. 4A.
Figure 6B:
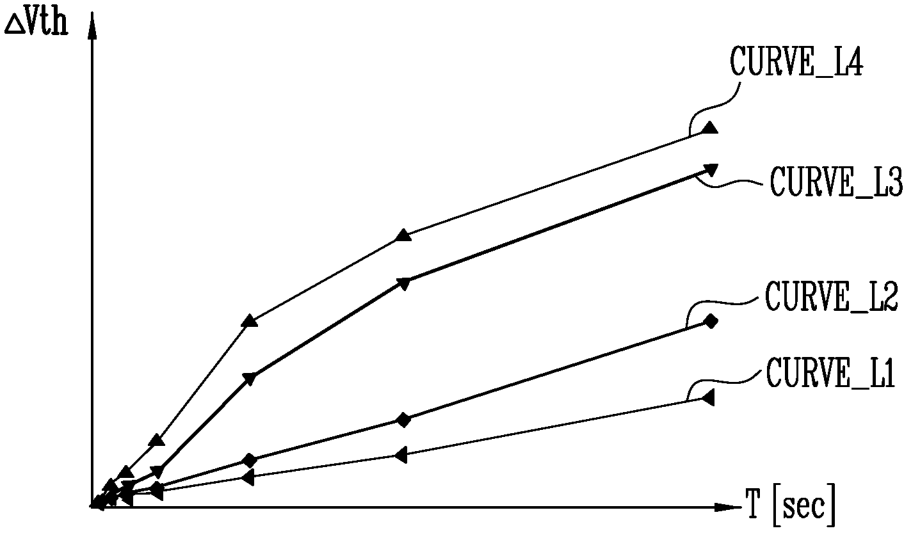
FIG. 6B is a diagram illustrating a change in voltage-current characteristics of the first transistor included in the pixel of FIG. 4A by light.

FIG. 6A is a diagram illustrating voltage-current characteristics of the first transistor included in the pixel of FIG. 4A. FIG. 6B is a diagram illustrating a change in voltage-current characteristics of the first transistor included in the pixel of FIG. 4A by light.

First, referring to FIGS. 4A and 6A, a first curve CURVE1 represents the voltage-current characteristics of the initial first transistor T1, and a second curve CURVE2 represents the voltage-current characteristics of the first transistor T1, when the first transistor T1 is exposed to light for a period of time (e.g., a specific period of time). As described above, the first transistor T1 may be an oxide semiconductor transistor.

As in the second curve CURVE2, when the first transistor T1 (or the channel area of the first transistor T1) is exposed to light for a period of time (e.g., a specific period of time), the voltage-current characteristics of the first transistor T1 may be negatively shifted with respect to the first curve CURVE1.

Initially, when a first voltage V1 is applied to the first transistor T1 (or to the gate electrode of the first transistor T1, or between the gate electrode and the source electrode of the first transistor T1), a first current 11 may flow in the first transistor T1 according to the first curve CURVE1. When the first voltage V1 is applied to the first transistor T1 exposed to light, a second current I2 larger than a first current I1 may flow in the first transistor T1, and the light emitting element supplied with the second current I2 may emit light at a luminance that is relatively higher than a desired luminance.

In order to allow the light emitting element to emit light at a desired luminance, the second voltage V2 lower than the first voltage V1 should be applied to the first transistor T1 exposed to light, according to the second curve CURVE2.

That is, the light may change the gate voltage Vg (or the gate-source voltage) of the first transistor by a difference between the first voltage V1 and the second voltage V2. This may be expressed as variation ΔVth of the first threshold voltage (e.g., the negative shift of the threshold voltage).

Referring to FIG. 6B, the first characteristic curve CURVE_L1 represents the variation ΔVth of the threshold voltage, as a function of time T, of the first transistor T1 exposed to light having a first intensity. The second characteristic curve CURVE_L2 represents the variation ΔVth of the threshold voltage, as a function of time T, of the first transistor T1 exposed to light having a second intensity larger than the first intensity. The third characteristic curve CURVE_L3 represents the variation ΔVTH of the threshold voltage, as a function of time T, of the first transistor T1 exposed to light having a third intensity larger than the second intensity. The fourth characteristic curve CURVE_L4 represents the variation ΔVth of the threshold voltage, as a function of time T, of the first transistor T1 exposed to light having a fourth intensity larger than the third intensity.

As illustrated in FIG. 6B, the larger the intensity of light is, the larger the variation ΔVth of the threshold voltage is as the function of time T.

When negative voltage rather than positive voltage is applied to the gate electrode of the first transistor T1 (i.e., when the gate-source voltage in the first transistor T1 has a negative voltage level), a change in the threshold voltage of the first transistor T1 may be accelerated.

For example, when the positive voltage is applied to the gate electrode of the first transistor T1, the threshold voltage of the first transistor T1 may vary depending on the first characteristic curve CURVE_L1. When the negative voltage is applied to the gate electrode of the second transistor T2, the threshold voltage of the second transistor T2 may vary depending on the second characteristic curve CURVE_L2.

While the first transistor T1 including the oxide semiconductor is driving, some of electrons in the channel of the first transistor T1 may be trapped around the gate insulating layer (e.g., in FIGS. 5A and 5B, the first insulating layer INS1 overlapping with the first semiconductor pattern), and thus the threshold voltage of the first transistor T1 may be shifted. When the negative voltage is applied to the gate electrode of the first transistor T1, the electrons (or photoelectrons) generated by the light are added in the state where the electrons are more than holes in the channel of the first transistor T1, so that the threshold voltage of the first transistor T1 may be significantly changed. When the positive voltage is applied to the gate electrode of the first transistor T1, the trapped electrons may be released by light and the threshold voltage of the first transistor T1 may be changed to be relatively small.

As described with reference to FIGS. 6A and 6B, the threshold voltage of the first transistor T1 implemented as the oxide semiconductor transistor may be generally changed in proportion to the light intensity, and the threshold voltage of the first transistor T1 may be changed more greatly when negative voltage is applied to the gate electrode of the first transistor T1 (i.e., in the state where negative bias voltage is applied).

Therefore, the display device 100 according to exemplary embodiments of the present invention may lower negative data voltage and may adjust a variation of the negative data voltage depending on the light intensity, when light is radiated onto the first transistor T1. Therefore, the acceleration of a change in characteristics of the first transistor T1 may be prevented or substantially reduced.

Figure 7:
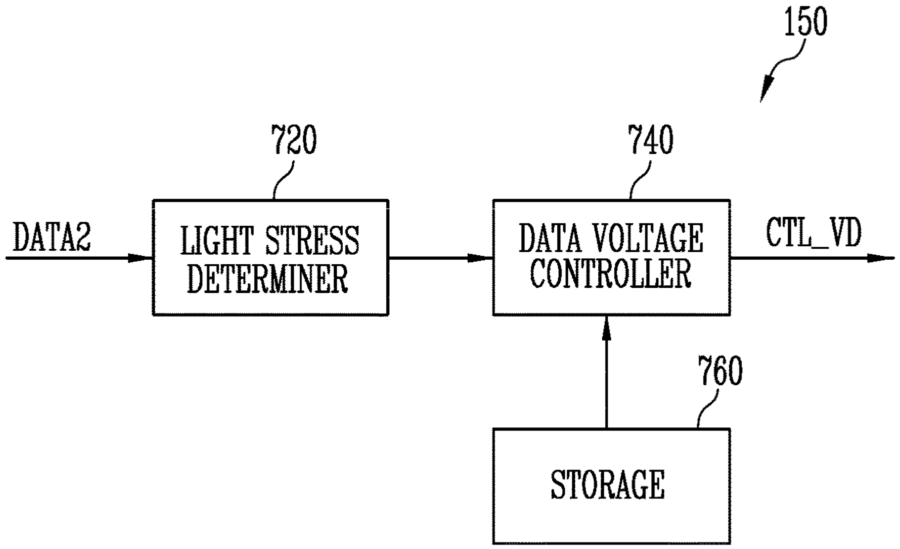
FIG. 7 is a block diagram illustrating an example of a light stress compensator included in the display device of FIG. 1B.

FIG. 7 is a block diagram illustrating an example of a light stress compensator included in the display device of FIG. 1B.

Referring to FIGS. 1B and 7, the light stress compensator 150 may include a light stress determiner 720 (or a light stress determination circuit) and a data voltage controller 740 (or a data voltage control circuit). In addition, the light stress compensator 150 may further include a storage 760 (or memory device).

The light stress determiner 720 may determine whether the pixel PX satisfies light stress conditions based on the image data DATA2 (or the input image data DATA1).

For example, when the light stress determiner 720 includes at least one sub-pixel where the pixel PX does not emit light, and at least one sub-pixel emitting light, it may be determined that the pixel PX satisfies the light stress conditions.

In an exemplary embodiment, if the data value for the corresponding sub-pixel is equal to or less than a reference value, the light stress compensator 150 may determine that the corresponding sub-pixel emits no light (or non-emissive sub-pixel). If the data value for the corresponding sub-pixel is larger than the reference value, the light stress compensator 150 may determine that the corresponding sub-pixel emits light (or emissive sub-pixel).

Figure 8:
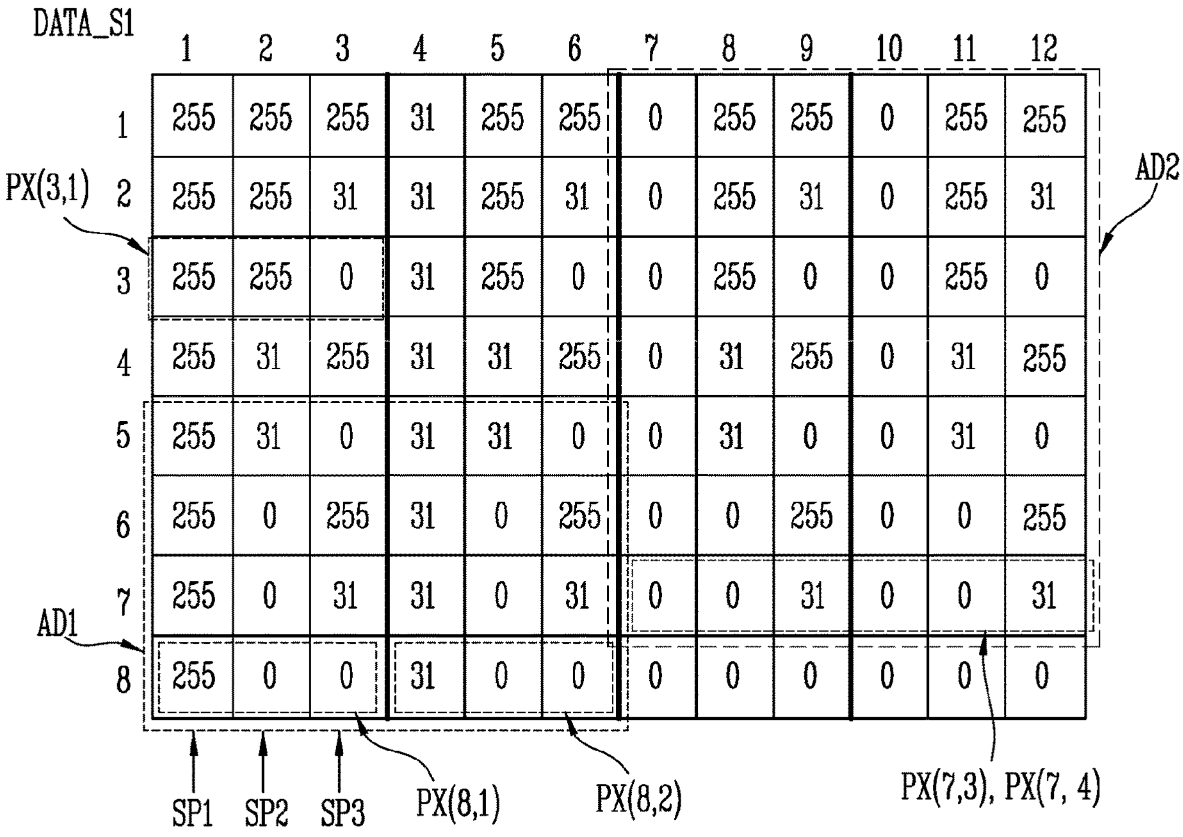
FIG. 8 is a diagram illustrating an example of input image data supplied to the display device of FIG. 1B.

Reference may be made to FIG. 8 to describe the light stress conditions. After describing the light stress conditions, the data voltage controller 740 will be described.

FIG. 8 is a diagram illustrating an example of input image data supplied to the display device of FIG. 1B. FIG. 8 illustrates a portion DATA_S1 of the input image data DATA1 including data values corresponding to the pixels PX provided in the display 110 of FIG. 1B. An example where the reference value that is the reference of the light stress conditions is 10 will be described below.

Referring to FIGS. 7 and 8, the pixel PX may correspond to three data values arranged in the same row depending on the structure of the pixel PX described with reference to FIG. 5A. The first data value among three data values may correspond to the first sub-pixel SP1, the second data value may correspond to the second sub-pixel SP2, and the third data value may correspond to the third sub-pixel SP3.

For example, data values corresponding to the 3-1th pixel PX(3,1) may be 255, 255 and 0. Here, the 3-1th pixel PX(3,1) may be a pixel disposed in a third pixel row and a first pixel column, and a pixel column may be different from a sub-pixel column.

In this case, the light stress determiner 720 may determine that a third sub-pixel SP3 of the 3-1th pixel PX(3,1) emits no light, first and second sub-pixels SP1 and SP2 of the 3-1th pixel PX(3,1) emit light, and the 3-1th pixel PX(3,1) satisfies the light stress conditions.

Likewise, the light stress determiner 720 may determine that the pixels (e.g., a 8-1th pixel PX(8,1), a 8-2th pixel PX(8,2), a 7-3th pixel PX(7,3), a 7-4th pixel PX(7,4), etc.) corresponding to a first data area AD1 and a second data area AD2 satisfy the light stress conditions.

In an exemplary embodiment, the light stress determiner 720 may determine whether at least one sub-pixel emits light, based on the first sub-pixel SP1 and the second sub-pixel SP2 excluding the third sub-pixel SP3.

As described with reference to FIG. 5A, the first and second sub-pixels SP1 and SP2 may include first and second color conversion layers CCL1 and CCL2 (or quantum dots QD1 and QD2), and the third sub-pixel SP3 may have no color conversion layer (and light scattering layer). In this case, light emitted from the third sub-pixel SP3 may not proceed to the pixel circuit layer PCL of adjacent pixels (e.g., first and second sub-pixels SP1 and SP2). Thus, the light emission of the third sub-pixel SP3 may not be considered.

For example, in the 7-3th pixel PX(7,3) and the 7-4th pixel PX(7,4), the first sub-pixel SP1 and the second sub-pixel SP2 excluding the third sub-pixel SP3 do not emit light, so that the light stress determiner 720 determines that there is no emissive sub-pixel, and the 7-3th pixel PX(7,3) and the 7-4th pixel PX(7,4) do not satisfy the light stress conditions.

Referring back to FIG. 7, when the pixel PX satisfies the light stress conditions, the data voltage controller 740 may generate the data voltage control signal CTL_VD for the non-emissive sub-pixel in the pixel PX based on the data value of the light-emitting sub-pixel in the pixel PX. Here, the data voltage control signal CTL_VD may be a signal that varies the voltage level of the black bias offset voltage. The black bias offset voltage may be equal to the data voltage corresponding to a minimum data voltage (e.g., grayscale value of 0).

In an exemplary embodiment, when the first sub-pixel SP1 does not emit light and the second sub-pixel SP2 emits light, the light stress compensator 150 may generate a first data voltage control signal to increase the voltage level of the first data voltage of the first sub-pixel SP1 in proportion to the second data value of the second sub-pixel SP2.

Figure 9:
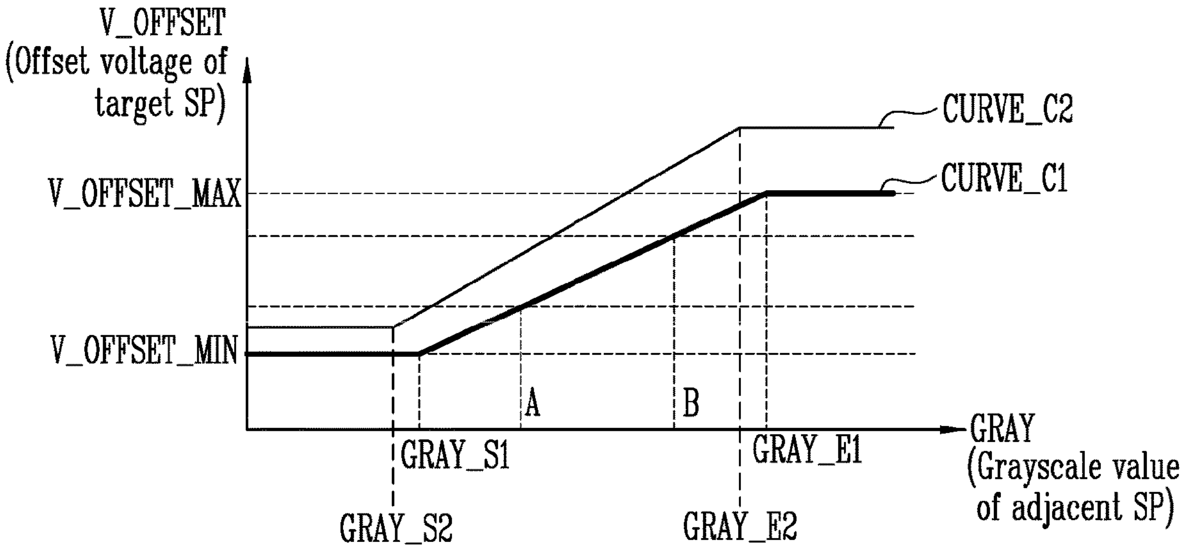
FIG. 9 is a diagram illustrating a black bias offset voltage varied by the light stress compensator of FIG. 7.

Reference may be made to FIG. 9 to describe the configuration for generating the data voltage control signal CTL_VD.

FIG. 9 is a diagram illustrating the black bias offset voltage varied by the light stress compensator of FIG. 7.

Referring to FIGS. 7 and 9, the first voltage curve CURVE_C1 may represent the black bias offset voltage V_OFFSET of the first sub-pixel SP1 according to the second data value (or the grayscale value GRAY, the data value of the adjacent sub-pixel) of the second sub-pixel SP2.

When the second data value of the second sub-pixel SP2 is equal to or less than a first start value GRAY_S1 (or a first start grayscale value) according to the first voltage curve CURVE_C1, the black bias offset voltage V_OFFSET of the first sub-pixel SP1 may have a minimum voltage level V_OFFSET_MIN. That is, if the second data value of the second sub-pixel SP2 is equal to or less than the first start value GRAY_S1, the data voltage controller 740 may determine that the light stress of the second sub-pixel SP2 (or the first transistor T1 in the second sub-pixel SP2) by the light emitted from the second sub-pixel SP2 is insignificant, and may cause the black bias offset voltage V_OFFSET to have a minimum voltage level V_OFFSET_MIN.

For example, the first start value GRAY_S1 may be the same as the second reference value that is the reference for determining whether the second sub-pixel SP2 emits light. In this case, the light stress determiner 720 may determine only whether the first sub-pixel SP1 emits light (or not) without the necessity of considering whether the second sub-pixel SP2 does not emit light. That is, the light stress determiner 720 may determine whether the pixel PX (or the first sub-pixel SP1) will be subjected to light stress, instead of determining whether the pixel PX satisfies the light stress conditions.

When the second data value of the second sub-pixel SP2 is larger than a first end value GRAY_E1 (or a first end grayscale value), the black bias offset voltage V_OFFSET of the first sub-pixel SP1 may have a maximum voltage level V_OFFSET_MAX. That is, if the second data value of the second sub-pixel SP2 is larger than the first end value GRAY_E1, the data voltage controller 740 may determine that the light stress of the second sub-pixel SP2 (or the first transistor T1 in the second sub-pixel SP2) by the light emitted from the second sub-pixel SP2 is maximum (or there is no change in light stress by an increase in data value), and may cause the black bias offset voltage V_OFFSET to have a maximum voltage level V_OFFSET_MAX.

When the second data value of the second sub-pixel SP2 is larger than the first start value GRAY_S1 and is equal to or less than the first end value GRAY_E1, the black bias offset voltage V_OFFSET of the first sub-pixel SP1 may be changed depending on the data value of the second sub-pixel SP2, within a range between the minimum voltage level V_OFFSET_MIN and the maximum voltage level V_OFFSET_MAX.

For example, the black bias offset voltage V_OFFSET of the first sub-pixel SP1 may be linearly changed in proportion to the data value of the second sub-pixel SP2. For example, the voltage level of the black bias offset voltage V_OFFSET of the first sub-pixel SP1 when the data value of the second sub-pixel SP2 is "B (e.g., the grayscale value of 150)" may be larger than the voltage level of the black bias offset voltage V_OFFSET of the first sub-pixel SP1 when the data value of the second sub-pixel SP2 is "A (e.g., the grayscale value of 150)".

However, this is only for illustrative purposes. The present invention is not limited thereto. For example, a variation rate of the black bias offset voltage V_OFFSET of the first sub-pixel SP1 may be linearly increased or reduced in proportion to the data value. That is, the black bias offset voltage V_OFFSET of the first sub-pixel SP1 may be changed in the shape of a parabola depending on the data value of the second sub-pixel SP2.

In an exemplary embodiment, the black bias offset voltage V_OFFSET of the second sub-pixel SP2 may be set to be different from the black bias offset voltage V_OFFSET of the first sub-pixel SP1.

For example, the second voltage curve CURVE_C2 may represent the black bias offset voltage V_OFFSET of the second sub-pixel SP2, depending on the first data value (or the grayscale value GRAY) of the first sub-pixel SP1.

The second start value GRAY_S2 that is one of inflection points of the second voltage curve CURVE_C2 may be different from the first start value GRAY_S1, while the second end value GRAY_E2 that is another one of the inflection points of the second voltage curve CURVE_C2 may be different from the first end value GRAY_E1 In addition, according to the second voltage curve CURVE_C2, the minimum voltage level of the black bias offset voltage V_OFFSET of the second sub-pixel SP2 may be different from the minimum voltage level V_OFFSET_MIN of the first sub-pixel SP1, the maximum voltage level of the black bias offset voltage V_OFFSET of the second sub-pixel SP2 may be different from the maximum voltage level V_OFFSET_MAX of the first sub-pixel SP1, and the variation rate of the black bias offset voltage V_OFFSET of the second sub-pixel SP2 may be different from the variation rate of the black bias offset voltage V_OFFSET of the first sub-pixel SP1.

Likewise, the black bias offset voltage V_OFFSET of the third sub-pixel SP3 may be set to be different from the black bias offset voltage V_OFFSET of the first sub-pixel SP1 (and/or the black bias offset voltage V_OFFSET of the second sub-pixel SP2).

In an exemplary embodiment, the minimum voltage level V_OFFSET_MIN and/or the maximum voltage level V_OFFSET_MAX of the black bias offset voltage V_OFFSET of the first sub-pixel SP1 may vary with time.

As described with reference to FIG. 6B, the variation of the threshold voltage of the first sub-pixel SP1 may increase as time passed, and the variation of the threshold voltage of the first sub-pixel SP1 may be measured by the compensator 160 that is described with reference to FIG. 1B.

Therefore, the data voltage controller 740 may determine the voltage curve based on the variation of the threshold voltage of the first sub-pixel SP1 measured by the compensator 160 (e.g., may select one of the first and second voltage curves CURVE_C1 and CURVE_C2), and may change the black bias offset voltage V_OFFSET based on the determined voltage curve. For example, the data voltage controller 740 may apply the first voltage curve CURVE_C1 to the first sub-pixel SP1 at a first time, and may apply the second voltage curve CURVE_2 to the first sub-pixel SP1 at a second time.

Referring back to FIG. 7, the storage 760 may store the first reference value for the first sub-pixel SP1, the first start value GRAY_S1, the first end value GRAY_E1, the minimum voltage level V_OFFSET_MIN, and the maximum voltage level V_OFFSET_MAX. In other words, the storage 760 may store constants (or coefficients) utilized to adjust the black bias offset voltage V_OFFSET of the first sub-pixel SP1. For example, the constants may be stored in the storage 760 in the form of a lookup table.

Similarly, the storage 760 may store constants that are utilized to adjust the black bias offset voltage V_OFFSET of the second sub-pixel SP2 and the black bias offset voltage V_OFFSET of the third sub-pixel SP3, respectively.

As described with reference to FIGS. 7 to 9, the light stress compensator 150 may determine whether the pixel PX satisfies the light stress conditions. If the pixel PX satisfies the light stress conditions, the data voltage for the non-emissive sub-pixel in the pixel PX may be increased based on the data value of the emissive sub-pixel in the pixel PX. Therefore, the negative bias light stress of the driving transistor of the non-emissive sub-pixel may be relieved, and a change in characteristics of the driving transistor may be reduced.

Figure 10A:
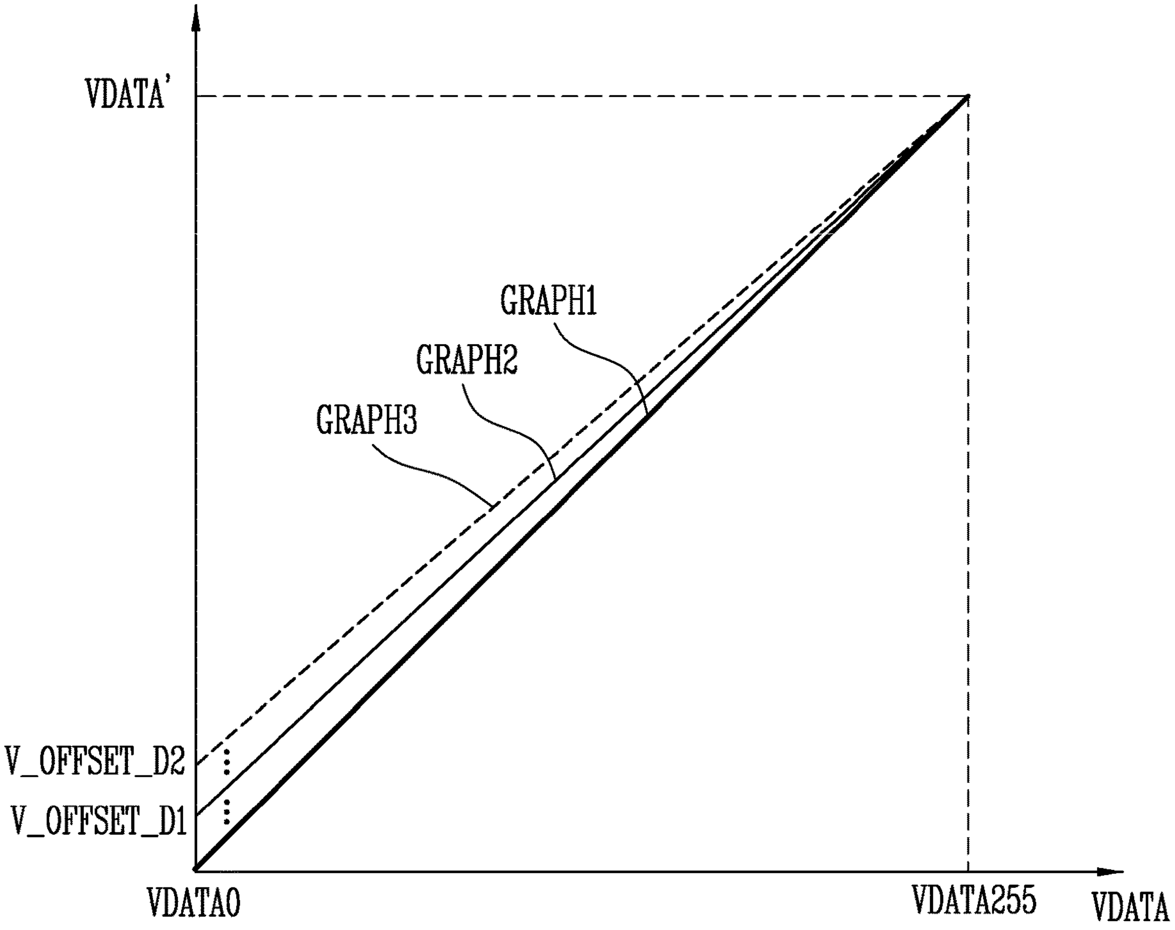
FIGS. 10A-10B are diagrams illustrating an example of data voltages varied by the light stress compensator of FIG. 7.
Figure 10B:
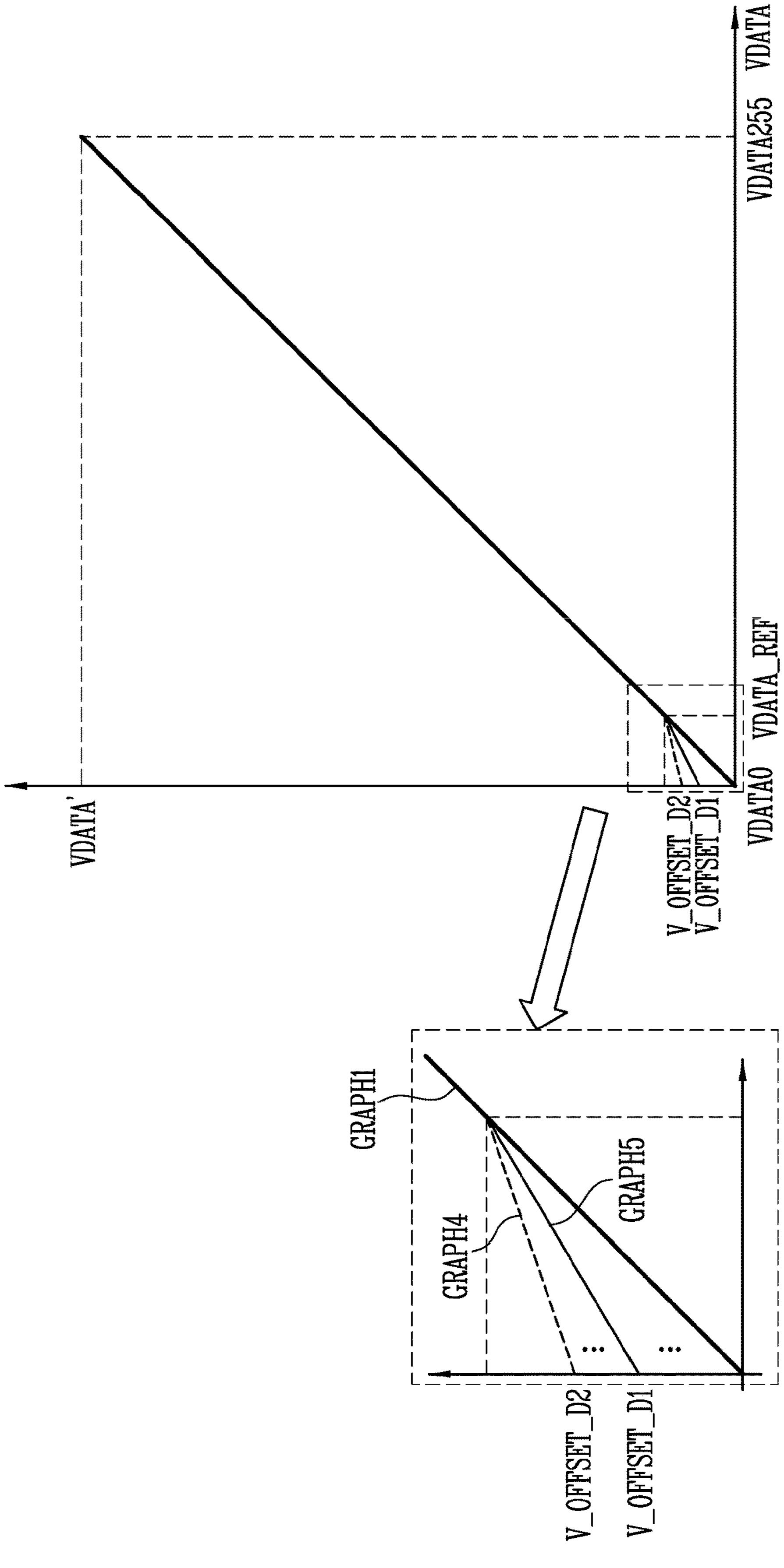

FIGS. 10A and 10B are diagrams illustrating an example of data voltages varied by the light stress compensator of FIG. 7.

FIGS. 10A and 10B illustrate a relationship between data voltage before being varied (e.g., the first data voltage of the first sub-pixel SP1, hereinafter referred to as "normal data voltage VDATA") and data voltage after being varied by the data voltage control signal CTL_VD (e.g., the varied first data voltage of the first sub-pixel SP1, hereinafter referred to as "varied data voltage VDATA'").

First, referring to FIGS. 7 and 10A, when the second data value of the second sub-pixel SP2 is equal to or less than the first start value GRAY_S1 described with reference to FIG. 9, the first graph GRAPH1 may show a relationship between the normal data voltage VDATA and the varied data voltage VDATA'.

As described with reference to FIG. 9, when the second data value of the second sub-pixel SP2 is equal to or less than the first start value GRAY_S1, the black bias offset voltage V_OFFSET is not varied, so that the data voltage VDATA' varied according to the first graph GRAPH1 may be the same as the normal data voltage VDATA.

When the second data value of the second sub-pixel SP2 is "A" illustrated in FIG. 9, the second graph GRAPH2 may represent a relationship between the normal data voltage VDATA and the varied data voltage VDATA'.

In this case, the varied data voltage VDATA' may be larger than the normal data voltage VDATA by up to (i.e., at most) a first voltage difference V_OFFSET_D1. Here, the first voltage difference V_OFFSET_D1 may be a voltage difference between a voltage level of the black bias offset voltage V_OFFSET when the second data value of the second sub-pixel SP2 is "A" and the minimum voltage level V_OFFSET_MIN. For example, the varied data voltage VDATA' corresponding to the data value of 0 may be larger than the normal data voltage VDATA (or VDATA0) corresponding to the data value of 0 by the first voltage difference V_OFFSET_D1. The larger the data value corresponding to the normal data voltage VDATA may be, the smaller the difference between the varied data voltage VDATA' and the normal data voltage VDATA may be. For example, the varied data voltage VDATA' corresponding to the data value of 255 may be equal to the normal data voltage VDATA (or VDATA255) corresponding to the data value of 255.

That is, the varied data voltage VDATA' may be set by interpolating the first voltage difference V_OFFSET_D1 in an entire portion based on the data value (e.g., the data value of the first sub-pixel SP1).

When the second data value of the second sub-pixel SP2 is larger than the first end value (GRAY_E1), the third graph GRAPH3 may represent a relationship between the normal data voltage VDATA and the varied data voltage VDATA'.

In this case, the varied data voltage VDATA' may be larger than the normal data voltage VDATA by up to (i.e., at most) a second voltage difference V_OFFSET_D2.

As described with reference to FIG. 10A, the variation of the data voltage of the first sub-pixel SP1 may be set by interpolating the set or predetermined black bias offset voltage V_OFFSET (see, e.g., FIG. 9) throughout the entire portion of the data voltage.

However, the present invention is not limited thereto, and the data voltage of the first sub-pixel SP1 may be varied only for a portion of the data voltage instead of the entire portion of the data voltage.

Referring to FIGS. 7 and 10B, when the second data value of the second sub-pixel SP2 is "A" illustrated in FIG. 9, the fourth graph GRAPH4 may represent a relationship between the normal data voltage VDATA and the varied data voltage VDATA'.

The varied data voltage VDATA' may be changed within a range smaller than the reference data voltage VDATA_REF, as compared to the normal data voltage VDATA. For example, the reference data voltage VDATA_REF may correspond to the first reference value (e.g., the data value of 32).

For example, the varied data voltage VDATA' corresponding to the data value of 0 may be larger than the normal data voltage VDATA (or VDATA0) corresponding to the data value of 0 by the first voltage difference V_OFFSET_D1. For example, the varied data voltage VDTA' and the normal data voltage (VDATA) (or the reference data voltage VDATA_REF) corresponding to the first reference value may be equal to each other.

Within a range where the normal data voltage VDATA is smaller than the reference data voltage VDATA_REF, the varied data voltage VDATA' may be set by interpolating the first voltage difference V_OFFSET_D1 based on the data value (e.g., the data value of the first sub-pixel SP1).

When the second data value of the second sub-pixel SP2 is larger than the first end value (GRAY_E1), the fifth graph GRAPH5 may represent a relationship between the normal data voltage VDATA and the varied data voltage VDATA'. Since the fifth graph GRAPH5 is similar to the fourth graph GRAPH4 except for the second voltage difference V_OFFSET_D2, a duplicated description thereof will not be repeated herein.

Figure 11:
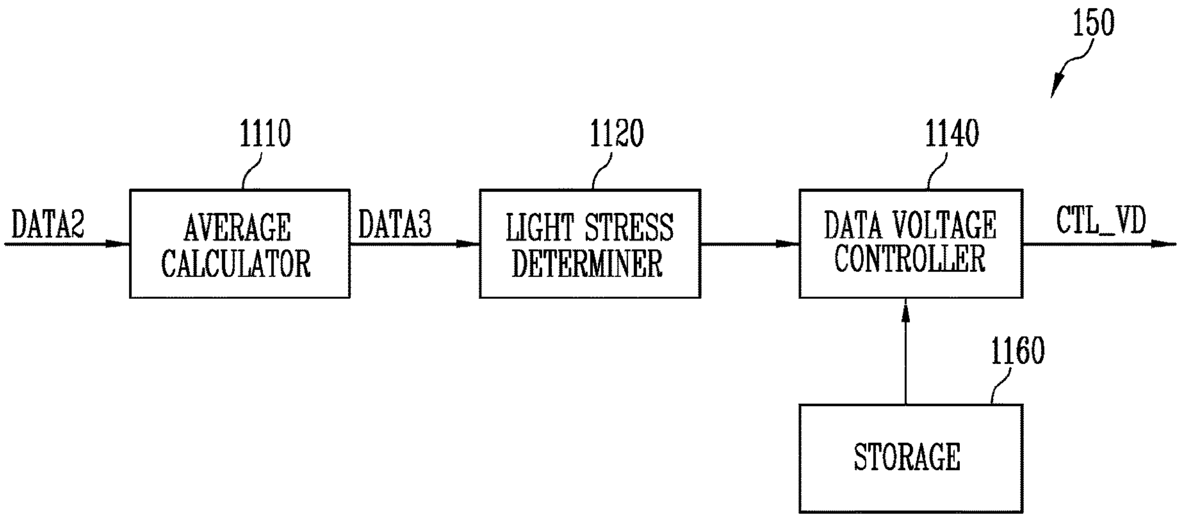
FIG. 11 is a block diagram illustrating another example of a light stress compensator included in the display device of FIG. 1B.

FIG. 11 is a block diagram illustrating another example of the light stress compensator included in the display device of FIG. 1B.

Referring to FIGS. 7 and 11, the light stress compensator 150 of FIG. 11 may include an average calculator 1110 (or an average-data-value calculator, an average-data-value operating circuit, an average grayscale calculator), a light stress determiner 1120, a data voltage controller 1140, and a storage 1160. Since the light stress determiner 1120, the data voltage controller 1140, and the storage 1160 are substantially equal or similar to the light stress determiner 720, the data voltage controller 740, and the storage 760 described with reference to FIG. 7, a duplicated description thereof will not be repeated herein.

The average calculator 1110 may divide the image data DATA2 (or the input image data DATA1) into a plurality of pieces of sub data, and may calculate the average data value for the pieces of sub data.

For example, the average calculator 1110 may divide the image data DATA2 into pieces of sub data based on a preset reference block, and the reference block may correspond to 8*8 and 16*16 pixels. In other words, the pieces of sub data may correspond to sub display areas (or a pixel group including a plurality of pixels) into which the display 110 is divided by the reference block.

Figure 12:
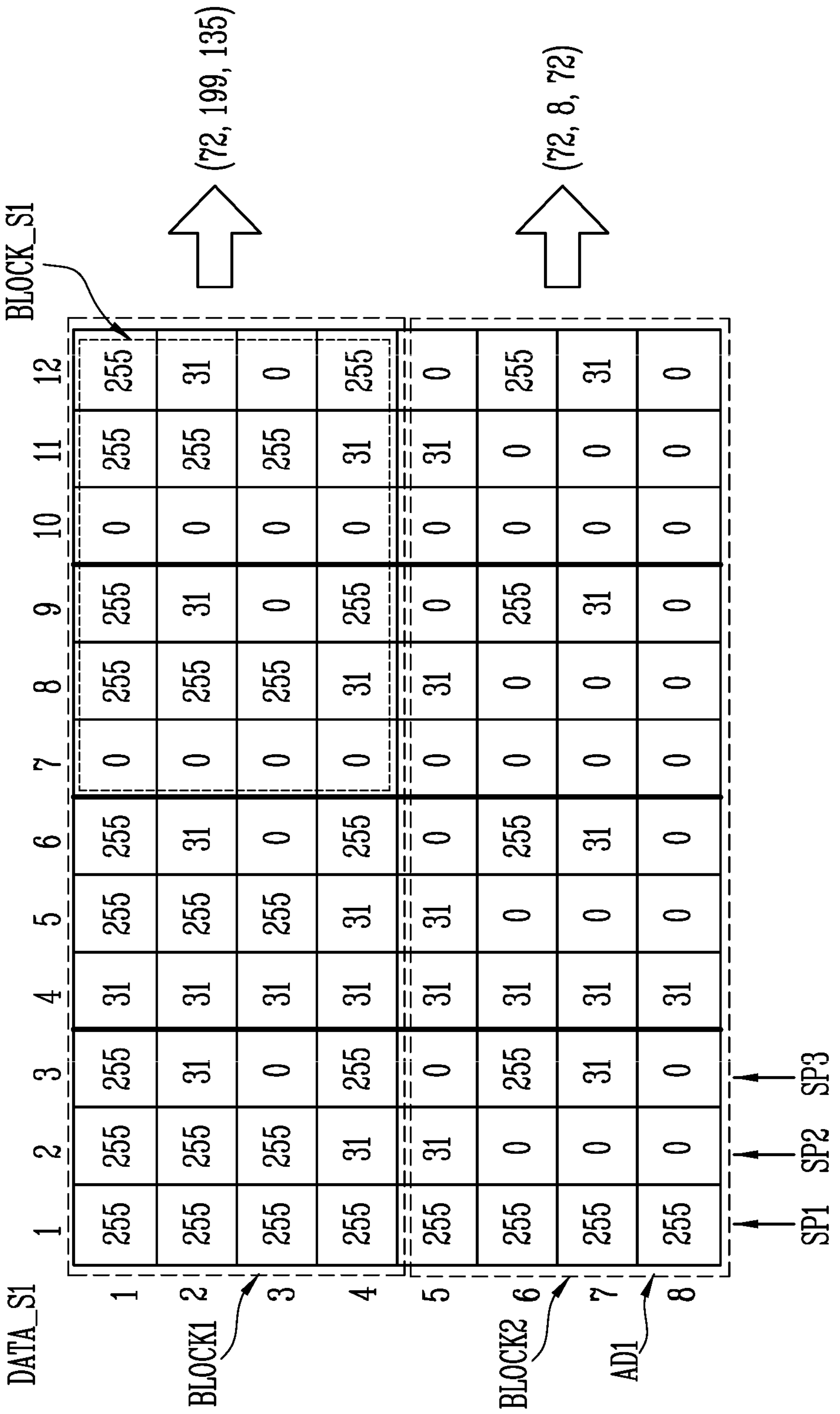
FIG. 12 is a diagram illustrating another example of input image data supplied to the display device of FIG. 1B.

Reference may be made to FIG. 12 to describe the operation of the average calculator 1110.

FIG. 12 is a diagram illustrating another example of input image data supplied to the display device of FIG. 1B. FIG. 12 illustrates a portion DATA_S1 of the input image data DATA1 that is the same as that of FIG. 8.

Referring to FIGS. 1B and 12, the average calculator 1110 may divide the image data DATA2 (or the input image data DATA1) into blocks BLOCK1 and BLOCK2 (or block data) based on the reference block. For example, the reference block may have a 4*4 pixel size (or a 4*12 sub-pixel size). However, this is only for illustrative purposes. The present invention is not limited thereto. For example, the reference block may have a 4*6 pixel size as in the first sub block BLOCK_S1. As will be described later, the size of the reference block may vary depending on the image data DATA2 (or the input image data DATA1).

The average calculator 1110 may calculate the average data value for the respective blocks BLOCK1 and BLOCK2.

In an exemplary embodiment, the average calculator 1110 may calculate the average data value for each color of the sub-pixels SP1, SP2, and SP3.

For example, the average calculator 1110 may calculate a first sub average data value, by averaging data values corresponding to the first sub-pixels SP1 in the first block BLOCK1. Similarly, the average calculator 1110 may calculate the second sub average data values by averaging data values corresponding to the second sub-pixel SP2 in the first block BLOCK1, and may calculate the third sub average data values by averaging data values corresponding to the third sub-pixel SP3 in the first block BLOCK1. For example, the average data value for the first block BLOCK1 may be (72, 199, 135).

Similarly, the average calculator 1110 may calculate an average data value for the second block BLOCK2. For example, the average data value for the second block BLOCK2 may be (72, 8, 72).

Referring back to FIG. 11, the average calculator 1110 may generate the average data DATA3 including average data values of the blocks BLOCK1 and BLOCK2, and may provide the average data DATA3 to the light stress determiner 1120.

The light stress determiner 1120 may determine whether the pixel PX satisfies light stress conditions based on the average data DATA3.

In an exemplary embodiment, the light stress determiner 720 may determine that the first block BLOCK1 satisfies the light stress conditions, when the first sub average data value in the first block BLOCK1 is equal to or less than the first reference value and the second sub average data value in the first block BLOCK1 is equal to or more than the second reference value.

For example, referring to FIG. 12, since the first sub average data value in the first block BLOCK1 is larger than the first reference value (e.g., the data value of 10), the second sub average data value in the first block BLOCK1 is larger than the second reference value (e.g., the data value of 10), and the third sub average data value in the first block BLOCK1 is larger than the third reference value (e.g., the data value of 10), the light stress determiner 720 may determine that the first block BLOCK1 does not satisfy the light stress conditions. As another example, since the first sub average data value in the second block BLOCK2 is larger than the first reference value (e.g., the data value of 10), the second sub average data value in the second block BLOCK2 is smaller than the second reference value (e.g., the data value of 10), and the third sub average data value in the first block BLOCK1 is larger than the third reference value (e.g., the data value of 10), the light stress determiner 720 may determine that the second block BLOCK2 satisfies the light stress conditions.

When the block satisfies the light stress conditions, the data voltage controller 1140 may generate the data voltage control signal CTL_VD for the sub-pixel corresponding to the sub average data value (e.g., the second sub average data value) that is equal to or less than the reference value based on the sub average data value (e.g., the first sub average data value) exceeding the reference value.

For example, referring to FIG. 12, the first sub average data value of the second block BLOCK2 may be 72, and the second sub average data value may be 8. In this case, the data voltage controller 1140 may generate the data voltage control signal CTL_VD for the second sub-pixel SP2 corresponding to the second sub average data value, based on the first voltage curve CURVE_C1 and the first sub average data value described with reference to FIG. 9. The data voltage control signal CTL_VD may be applied to all second sub-pixels SP2 in the second block BLOCK2.

As described with reference to FIGS. 11 and 12, the light stress compensator 150 may calculate the average data value on the basis of the block (or the sub display area or the pixel group), may determine whether the block satisfies the light stress conditions based on the average data value, may generate the data voltage control signal CTL_VD for specific sub-pixels corresponding to another sub average data value that is equal to or less than the reference value based on the sub average data value exceeding the reference value in the block, and may vary the data voltage for the specific sub pixels in the block based on the data voltage control signal CTL_VD. Therefore, the load of the light stress compensator 150 may be reduced.

Figure 13:
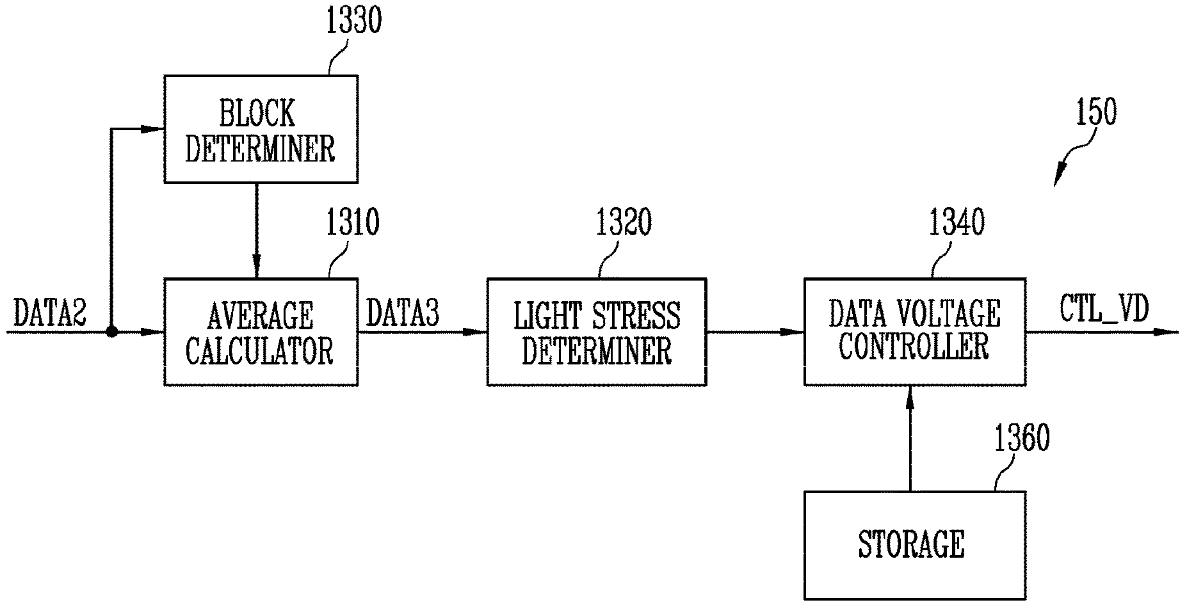
FIG. 13 is a block diagram illustrating a further example of a light stress compensator included in the display device of FIG. 1B.
Figure 14:
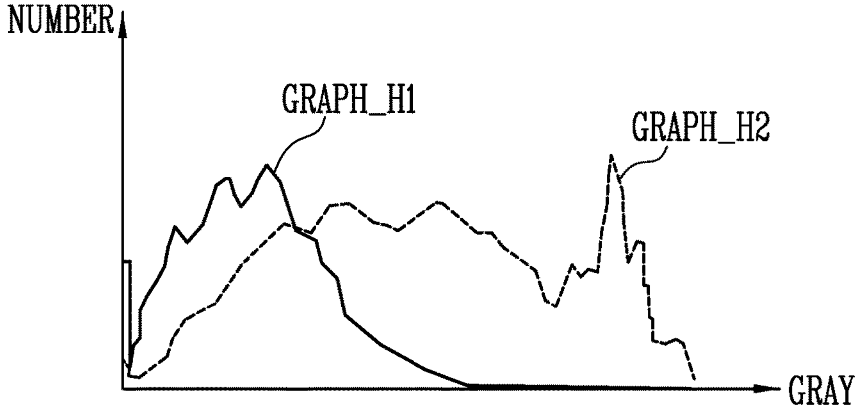
FIG. 14 is a diagram illustrating an example of data value distribution of input image data supplied to the display device of FIG. 1B.

FIG. 13 is a block diagram illustrating a further example of the light stress compensator included in the display device of FIG. 1B. FIG. 14 is a diagram illustrating an example of data value distribution of input image data supplied to the display device of FIG. 1B.

First, referring to FIGS. 11 and 13, the light stress compensator 150 of FIG. 13 may include an average calculator 1310, a light stress determiner 1320, a block determiner 1330 (or a block size determiner, a compensation area determiner), a data voltage controller 1340 and a storage 1360. Since the average calculator 1310, the light stress determiner 1320, the data voltage controller 1340, and the storage 1360 are substantially equal or similar to the average calculator 1110, the light stress determiner 1120, the data voltage controller 1140, and the storage 1160 described with reference to FIG. 11, a duplicated description thereof will not be repeated herein.

The block determiner 1330 may determine the size of the reference block based on the image data DATA2 (or the input image data DATA1).

In an exemplary embodiment, the block determiner 1330 may determine the size of the reference block by analyzing a histogram for the image data DATA2.

Referring to FIG. 14, a first distribution graph GRAPH_H1 (or a first histogram) may represent a histogram of the image data DATA2 (i.e., the number NUMBER for each grayscale value GRAY) at a first time, and a second distribution graph GRAPH_H2 (or a second histogram) may represent a histogram of the image data DATA2 at a second time that is different from the first time.

The first distribution graph GRAPH_H1 may show that the image data DATA2 (or data values) at the first time concentrates on a low grayscale section. In this case, the block determiner 1330 may determine the first reference block having a relatively large size as the reference block.

The second distribution graph GRAPH_H2 may show that the image data DATA2 (or data values) at the second time distributes over an entire grayscale value. In this case, the block determiner 1330 may determine the second reference block having a relatively small size (e.g., having a size smaller than that of the first reference block) as the reference block.

That is, the block determiner 1330 may determine the size of the reference block based on the distributed degree of the image data DATA2. The larger the distributed degree of the image data DATA2 may be, the smaller the size of the reference block may be. For example, the size of the reference block may be in inverse proportion to the distributed degree of the image data DATA2.

The average calculator 1310 may divide the image data DATA2 (or the input image data DATA1) into blocks based on the reference block determined by the block determiner 1330, and may calculate an average data value for each block.

As described with reference to FIGS. 13 and 14, the light stress compensator 150 may determine the size of the reference block based on the image data DATA2 (or the input image data DATA1). Therefore, the load of the light stress compensator 150 may be reduced while the accuracy of the light stress compensation may be improved (e.g., increased).

Although FIG. 13 illustrates that the block determiner 1330 is configured independently from the average calculator 1310, the present invention is not limited thereto. For example, the block determiner 1330 may be included in the average calculator 1310.

Figure 15:
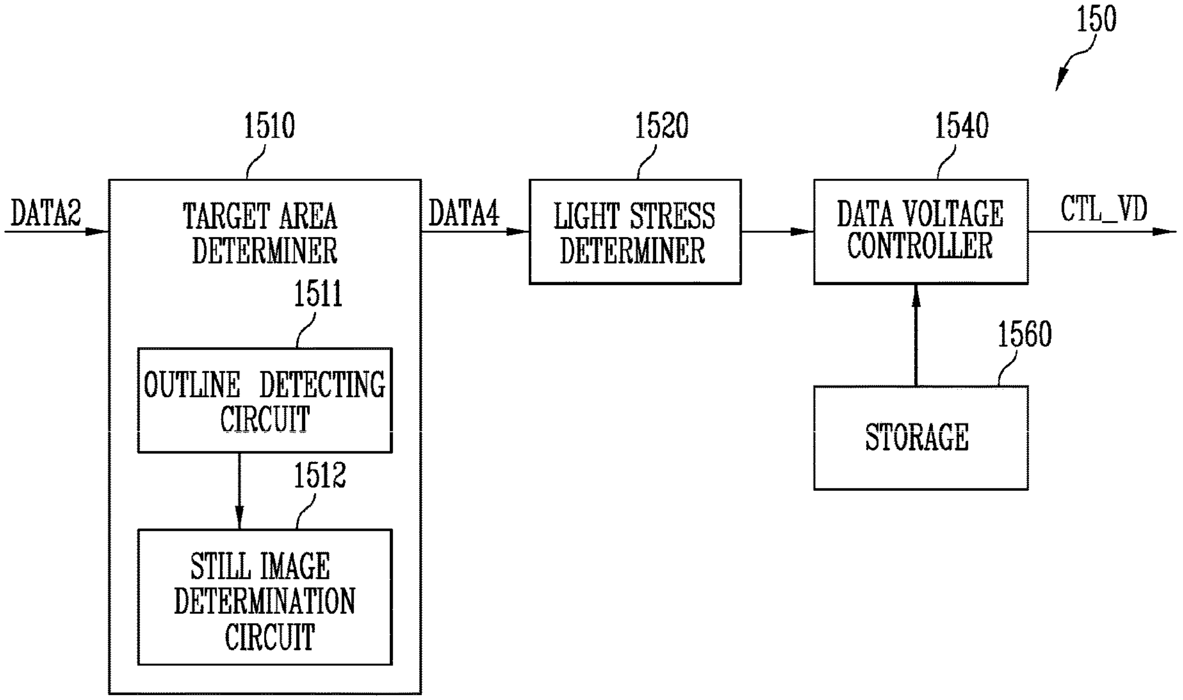
FIG. 15 is a block diagram illustrating a further example of a light stress compensator included in the display device of FIG. 1B.

FIG. 15 is a block diagram illustrating a further example of the light stress compensator included in the display device of FIG. 1B.

Referring to FIGS. 7 and 15, the light stress compensator 150 may include a target-area determiner 1510 (or a target-area decision circuit, a compensation-area determiner, a logo detector), a light stress determiner 1520, a data voltage controller 1540, and a storage 1560. Since the light stress determiner 1520, the data voltage controller 1540, and the storage 1560 are substantially equal or similar to the light stress determiner 720, the data voltage controller 740, and the storage 760 described with reference to FIG. 7, a duplicated description thereof will not be repeated herein.

The target-area determiner 1510 may determine a compensation area desired to utilize the light stress compensation, based on the image data DATA2 (or the input image data DATA1). The determiner described with reference to FIG. 13 may determine the reference block (or pieces of sub data corresponding to the reference block, sub display areas) based on one frame image, and the target-area determiner 1510 may determine the compensation area based on a plurality of frame images provided for a specific time. For example, the compensation area may be a logo area on which a logo is displayed. The logo may have a specific color (e.g., red), and thus the pixel included in the logo area may include an emissive sub-pixel (e.g., a red sub-pixel) and a non-emissive sub-pixel (e.g., a green sub-pixel, a blue sub-pixel).

In exemplary embodiments, the target-area determiner 1510 may include an outline detecting circuit 1511 and a still image determination circuit 1512.

The outline detecting circuit 1511 may detect an outline included in the image data DATA2 (or the frame image data) using an edge detection algorithm. Here, the outline may refer to a portion in which the luminance (or brightness) of the image changes from a low value to a high value or vice versa. For example, the outline may be a portion (e.g., a line edge) where the luminance is abruptly changed in a specific section but has the same luminance as the surroundings after passing through the specific section, or a portion (e.g. a step edge) where the luminance is abruptly changed between an area having a high luminance and an area having a low luminance.

The edge detection algorithm may include sobel edge detection techniques, Canny edge detection techniques and the like.

In an exemplary embodiment, the outline detecting circuit 1511 may calculate a luminance variation rate (or data on luminance variation rate) of an image corresponding to the image data DATA2, by primarily differentiating data values included in the image data DATA2, and may determine a portion where the luminance variation rate is larger than a reference luminance variation rate as the outline (or a point constituting the outline). For example, the outline detecting circuit 1511 may calculate a difference between adjacent data values that are adjacent to each other in a horizontal direction, a vertical direction, a diagonal direction and the like among the data values included in the image data DATA2, and may determine the difference as the luminance variation rate.

In an exemplary embodiment, the outline detecting circuit 1511 may calculate the sign of a luminance variation rate (e.g., a positive value or a negative value), by differentiating data on the luminance variation rate, that is, secondarily differentiating data values included in the image data DATA2, and may determine a portion where the luminance variation rate is larger than a reference luminance variation rate and the sign of the luminance variation rate has the positive value, as the outline.

Information about the detected outline may be supplied to the still image determination circuit 1512.

The still image determination circuit 1512 may determine whether the outline is a still image. For example, when the outline detected at the first time (or data values inside the outline) is the same as the outline detected at the second time, the still image determination circuit 1512 may determine that the outline or a portion delimited by the outline is the still image.

When the outline is detected and the outline is the still image, the target-area determiner 1510 may determine a portion of the display area corresponding to the outline (or a portion of the image data DATA2 corresponding to the outline) as the compensation area.

The target-area determiner 1510 may supply a portion of partial data DATA4 (i.e., the image data DATA2) corresponding to the compensation area to the light stress determiner 1520.

The light stress determiner 1520 may determine whether the pixels PX corresponding to the partial data DATA4 satisfy the light stress conditions.

In an exemplary embodiment, similar to the average calculator 1110 described with reference to FIG. 11, the light stress determiner 1520 may calculate the average data value for the partial data DATA4, and may determine whether the compensation area satisfies the light stress conditions based on the average data value. In this case, similar to the data voltage controller 1540 described with reference to FIG. 11, the data voltage controller 1540 may generate the data voltage control signal CTL_VD that is commonly applied to the specific sub-pixels (e.g., the blue sub-pixels) in the compensation areas.

Figure 16:
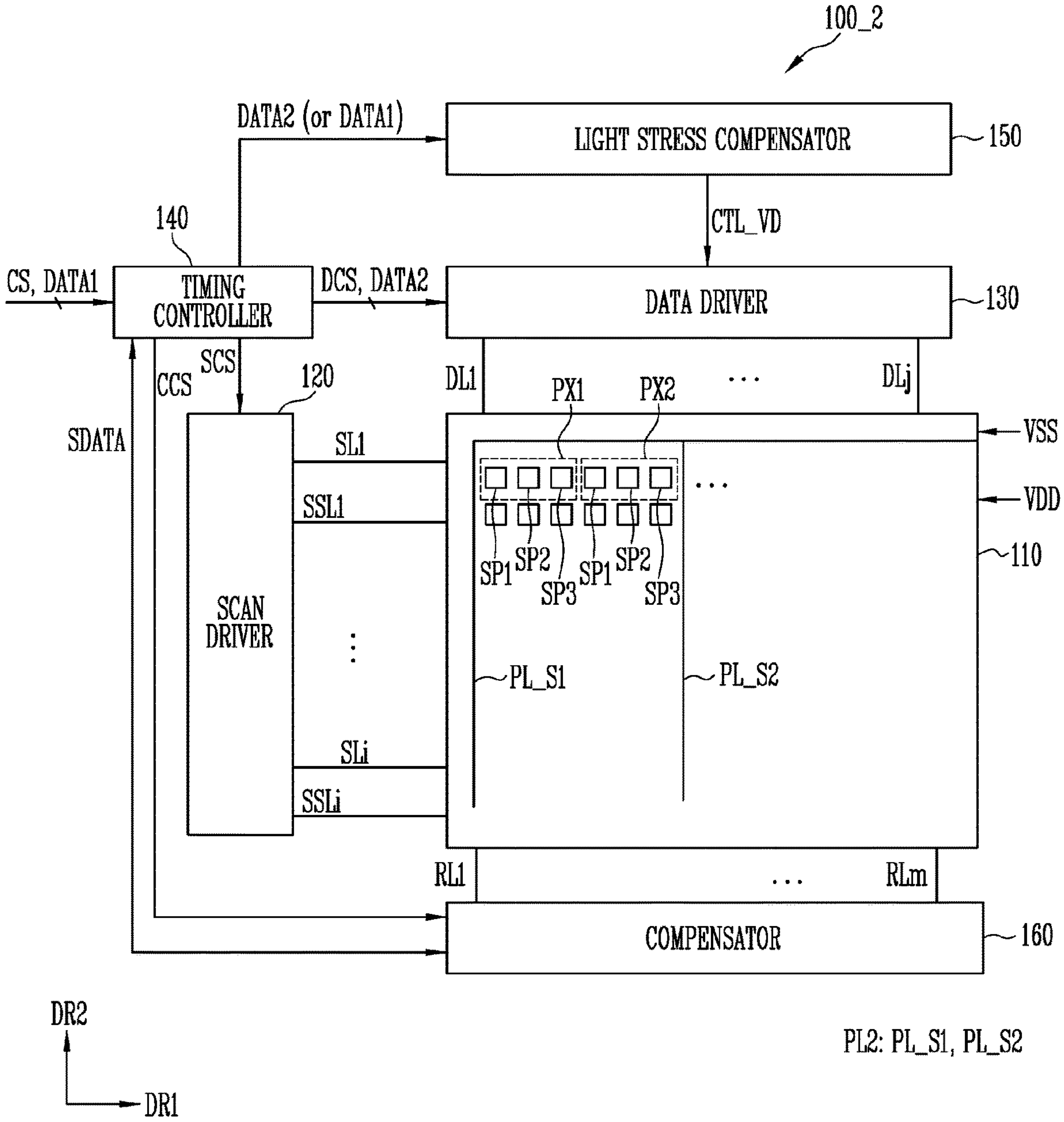
FIG. 16 is a block diagram illustrating another example of the display device of FIG. 1A.
Figure 17:
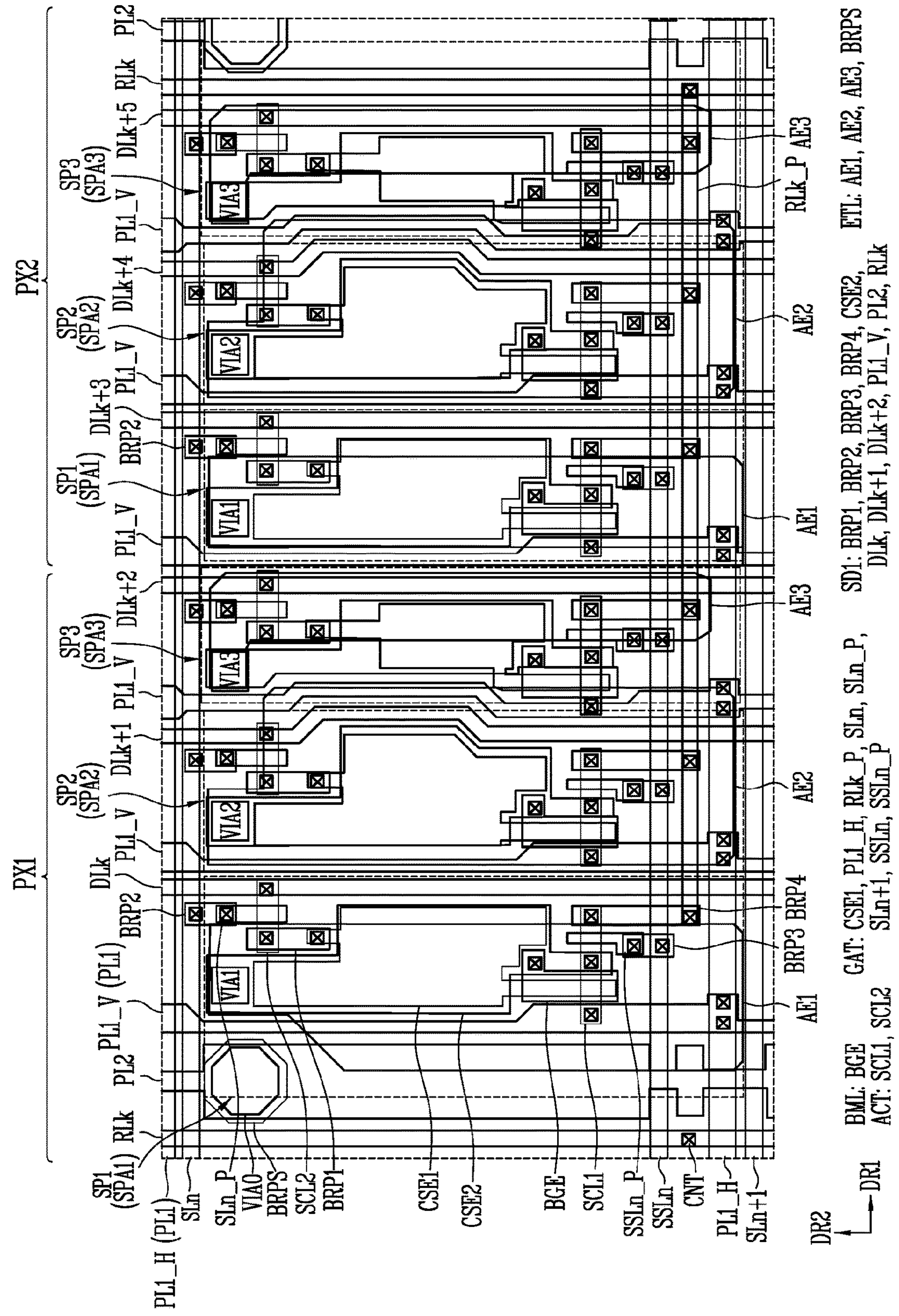
FIG. 17 is a layout illustrating an example of a pixel circuit layer of first and second pixels included in the display device of FIG. 1A.

FIG. 16 is a block diagram illustrating another example of the display device of FIG. 1A. The display device corresponding to the display device of FIG. 1B is illustrated in FIG. 16. FIG. 17 is a layout illustrating an example of a pixel circuit layer of first and second pixels included in the display device of FIG. 1A. The layout corresponding to the layout of FIG. 4A is illustrated in FIG. 17.

Referring to FIGS. 1B, 4A, 16 and 17, except for the arrangement relationship between the first and second pixels PX1 and PX2 and the second power line PL2, the display device 100_2 of FIG. 16 may be substantially equal or similar to the display device 100_1 of FIG. 1B, and the pixels PX1 and PX2 of FIG. 17 may be substantially equal or similar to the pixel PX of FIG. 4A. Thus, a duplicated description will not be repeated herein.

The second power line PL2 may include sub-power lines PL_S1 and PL_S2. The sub-power lines PL_S1 and PL_S2 may extend in a second direction DR2, and may be arranged in a first direction DR1.

The sub-power lines PL_S1 and PL_S2 may be arranged to be spaced apart from each other with a separation (e.g., an interval) larger than that of each of the pixels PX1 and PX2. For example, as illustrated in FIG. 16, the first and second pixels PX1 and PX2 may be arranged between the sub-power lines PL_S1 and PL_S2 in the first direction DR1.

Referring to FIG. 17, the second power line PL2 may extend in the second direction DR2. The second power line PL2 may be disposed on the left of the first sub-pixel SP1 of the first pixel PX1, and may be disposed on the right of the third sub-pixel SP3 of the second pixel PX2. That is, the second power line PL2 may be repetitively arranged on the basis of two pixels (or on the basis of six sub-pixels).

As described with reference to FIG. 4A, the width of the second power line PL2 may be larger than the width of the first vertical power line PL1_V and the width of the k-th data line DLk, and may be coupled to the cathode electrode of the light emitting element LED via a reference via VIA0 (or a via hole).

Referring back to FIG. 16, the light stress compensator 150 determines whether the first pixel PX1 satisfies the light stress conditions based on the image data DATA2 (or the input image data DATA1). If the first pixel PX1 satisfies the light stress conditions, the data voltage control signal CTL_VD for the sub-pixel that does not emit light in the first pixel PX1 based on the data value of the sub-pixel that emits light in the first pixel PX1 may be generated. Since the configuration for determining whether the first pixel PX1 satisfies the light stress conditions and the configuration for generating the data voltage control signal CTL_VD have been described with reference to FIGS. 8 to 10B, a duplicated description thereof will not be repeated herein.

In an exemplary embodiment, the light stress compensator 150 determines whether the first and second pixels PX1 and PX2 satisfy the light stress conditions based on the image data DATA2 (or the input image data DATA1). If the first and second pixels PX1 and PX2 satisfy the light stress conditions, the data voltage control signal CTL_VD for the sub-pixel that does not emit light in the first and second pixels PX1 and PX2 based on the data value of the sub-pixel that emits light in the first and second pixels PX1 and PX2 may be generated.

For example, the light stress compensator 150 may calculate the average data value for each sub-pixel (or each color of the sub-pixel) included in the first and second pixels PX1 and PX2, similar to the average calculator 1110 described with reference to FIG. 11. For example, the first sub average data values may be calculated by averaging data values of the first sub-pixel SP1 of the first pixel PX1 and the first sub-pixel SP1 of the second pixel PX2. Similarly, the light stress compensator 150 may calculate the second sub average data value for the second sub-pixel SP2, and the third sub average data value for the third sub-pixel SP3. Subsequently, the light stress compensator 150 may determine whether the first and second pixels PX1 and PX2 satisfy the light stress conditions based on the first to third sub average data values, and may generate the data voltage control signal CTL_VD. That is, the light stress compensator 150 may set the first and second pixels PX1 and PX2 arranged between the first sub power line PL_S1 and the second sub power liner PL_S2 (or between the second power lines PL2) as one block, and may compensate for the light stress on the basis of the block, as described with reference to FIG. 12.

Although FIGS. 16 and 17 illustrate that the second power line PL2 is repetitively arranged at the interval of two pixels, the present invention is not limited thereto.

Figure 18A:
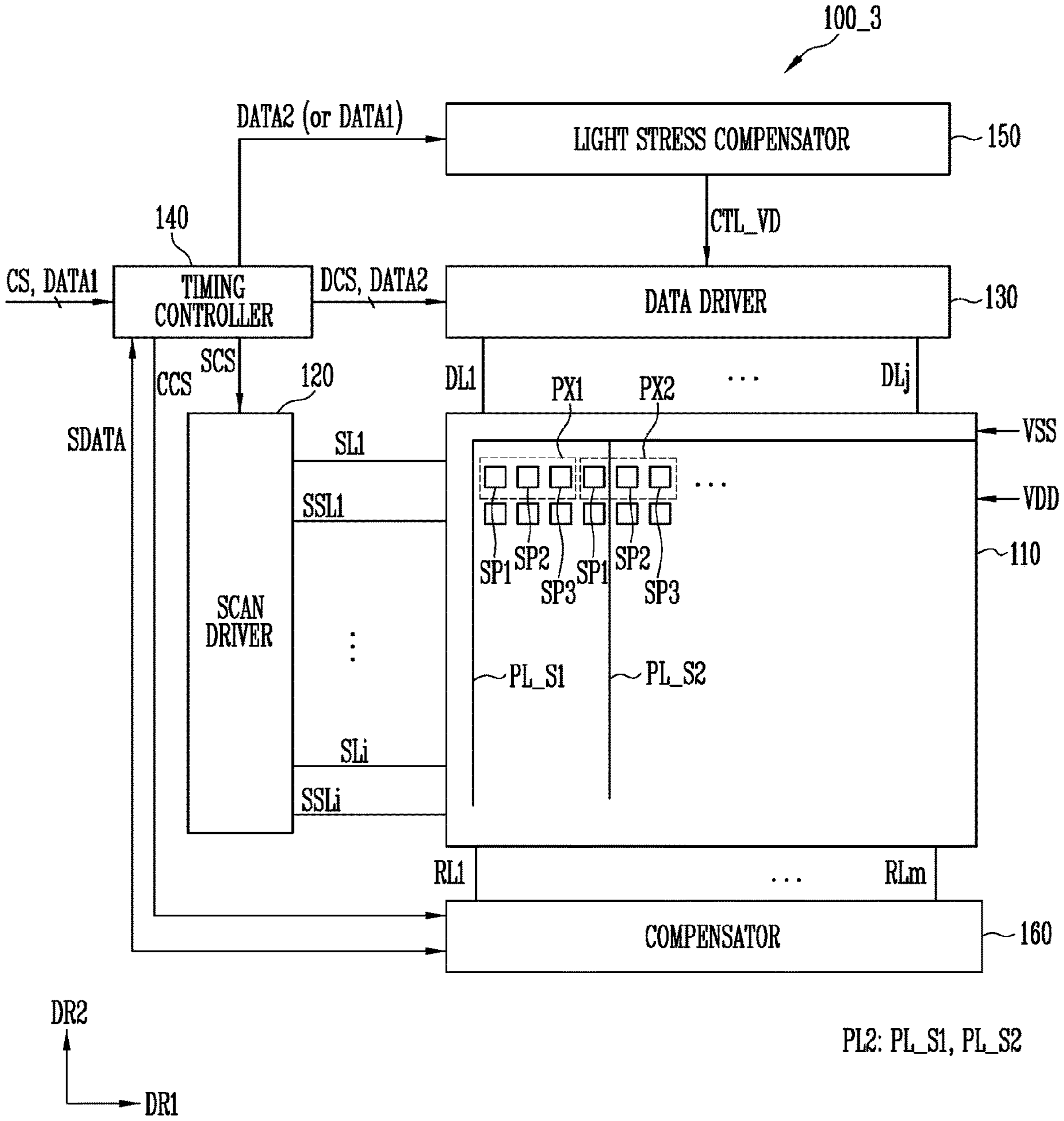
FIGS. 18A-18B are block diagrams illustrating a further example of the display device of FIG. 1A.
Figure 18B:
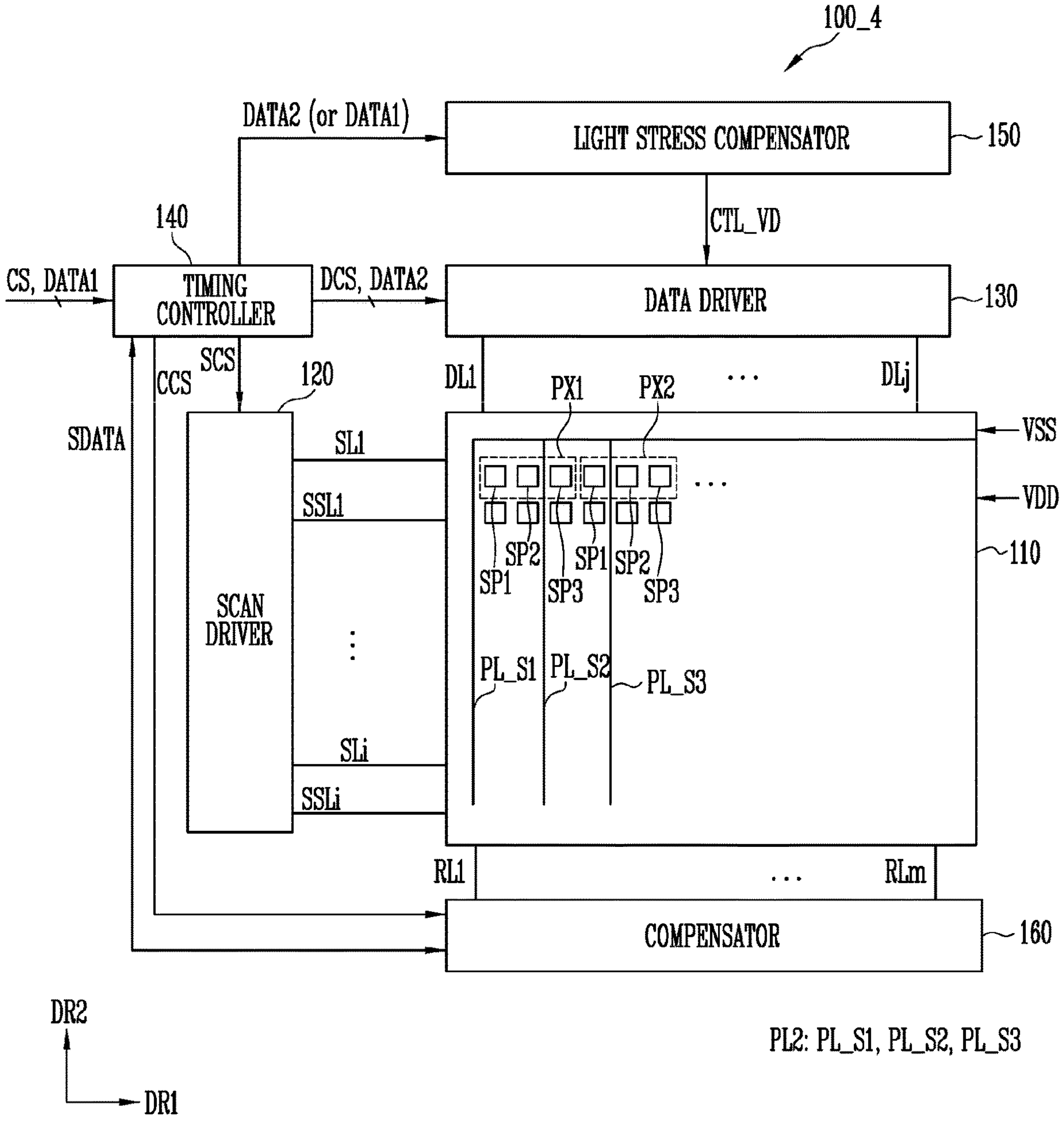

FIGS. 18A and 18B are block diagrams illustrating a further example of the display device of FIG. 1A. The display devices corresponding to the display device of FIG. 16 are illustrated in FIGS. 18A and 18B.

Referring to FIGS. 16 to 18B, except for the arrangement relationship between the first and second pixels PX1 and PX2 and the second power line PL2, the display device 100_3 of FIG. 18A and the display device 100_4 of FIG. 18B may be substantially equal or similar to the display device 100_2 of FIG. 16. Thus, a duplicated description thereof will not be repeated herein.

First, referring to FIG. 18A, the sub power lines PL_S1 and PL_S2 may be arranged to be spaced apart from each other at a separation (e.g., an interval) corresponding to four sub pixels.

In this case, the light stress compensator 150 may determine two first sub-pixels SP1, a second sub pixel SP2, and a third sub pixel SP3 as one unit pixel, may determine whether the unit pixel satisfies the light stress conditions, and may generate the data voltage control signal CTL_VD based on the determined result.

For example, the light stress compensator 150 may calculate the first sub average data value by averaging two data values of the first sub pixel SP1, and may determine whether the corresponding unit pixel satisfies the light stress conditions, based on the first sub average data value, the second data value of the second sub-pixel SP2, and the third data value of the third sub pixel SP3.

That is, the display device 100_3 may perform the light stress compensation on the basis of four sub pixels. If the unit pixel includes sub pixels of the same type (or the same color), the display device 100_4 may perform the light stress compensation partially using the light stress compensating method on the basis of the block (i.e., by calculating the average data value for the sub-pixels of the same color).

Referring to FIG. 18B, the sub power lines PL_S1, PL_S2 and PL_S3 may be arranged to be spaced apart from each other at a separation (e.g., an interval) corresponding to two sub pixels.

In this case, the light stress compensator 150 may determine the first sub-pixel SP1 and the second sub pixel SP2 as one unit pixel, may determine whether the unit pixel satisfies the light stress conditions, and may generate the data voltage control signal CTL_VD based on the determined result. Similarly, the light stress compensator 150 may determine the third sub pixel SP3 and the first sub-pixel SP1 located between the second and third sub power lines PL_S2 and PL_S3 as one unit pixel, may determine whether the unit pixel satisfies the light stress conditions, and may generate the data voltage control signal CTL_VD based on the determined result. That is, the display device 100_4 may perform the light stress compensation on the basis of two sub-pixels.

According to exemplary embodiments of the present invention, the display device may determine whether a transistor in a pixel is subjected to light stress (or negative bias light stress, light stress in a state where negative bias voltage is applied), and may vary black bias offset voltage for a non-emissive sub-pixel based on a data value of an emissive sub-pixel corresponding to light intensity. Therefore, a change in characteristics of the transistor may be mitigated.

It will be understood that, although the terms "first", "second", "third", etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section discussed below could be termed a second element, component, region, layer or section, without departing from the spirit and scope of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments and is not intended to be limiting of the inventive concept. As used herein, the singular forms "a" and "an" are intended to include the plural forms as well, unless the context clearly indicates otherwise. It will be further understood that the terms "include," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ.

Further, the use of "may" when describing embodiments of the inventive concept refers to "one or more embodiments of the inventive concept." Also, the term "exemplary" is intended to refer to an example or illustration.

It will be understood that when an element or layer is referred to as being "on", "connected to", "coupled to", or "adjacent" another element or layer, it can be directly on, connected to, coupled to, or adjacent the other element or layer, or one or more intervening elements or layers may be present. When an element or layer is referred to as being "directly on," "directly connected to", "directly coupled to", or "immediately adjacent" another element or layer, there are no intervening elements or layers present.

As used herein, the term "substantially," "about," and similar terms are used as terms of approximation and not as terms of degree, and are intended to account for the inherent variations in measured or calculated values that would be recognized by those of ordinary skill in the art.

As used herein, the terms "use," "using," and "used" may be considered synonymous with the terms "utilize," "utilizing," and "utilized," respectively.

The display device and/or any other relevant devices or components according to embodiments of the present invention described herein may be implemented utilizing any suitable hardware, firmware (e.g. an application-specific integrated circuit), software, or a suitable combination of software, firmware, and hardware. For example, the various components of the display device may be formed on one integrated circuit (IC) chip or on separate IC chips. Further, the various components of the display device may be implemented on a flexible printed circuit film, a tape carrier package (TCP), a printed circuit board (PCB), or formed on a same substrate. Further, the various components of the display device may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the exemplary embodiments of the present invention.

The scope of the present invention is not limited by detailed descriptions of the present specification, and should be defined by the accompanying claims. Furthermore, all changes or modifications of the present invention derived from the meanings and scope of the claims, and equivalents thereof should be construed as being included in the scope of the present invention.

What is claimed is:

1. A display device comprising:

a display panel comprising sub-pixels in a first display area, the sub-pixels comprising first sub-pixels to emit light with a first color and second sub-pixels to emit light with a second color; and a data driver configured to generate data voltages based on data values of image data for the sub-pixels, and to provide the data voltages to the sub-pixels, wherein, when a still image is displayed in the first display area, the data driver varies a black bias offset voltage of the sub-pixels based on a portion of the image data corresponding to the still image, wherein the black bias offset voltage corresponds to a minimum value in a range of the data values, and wherein a first variation rate of the black bias offset voltage of the first sub-pixels according to the portion of the image data corresponding to the still image is different from a second variation rate of the black bias offset voltage of the second sub-pixels according to the portion of the image data.

2. The display device according to claim 1, wherein the data driver is configured to vary the black bias offset voltage of the sub-pixels based on a first average data value that is an average of the data values for the first sub-pixels in the portion of the image data.

3. The display device according to claim 2, wherein, as the first average data value of the first sub-pixels in the first display area changes, the data driver varies the black bias offset voltage of the second sub-pixels in the first display area.

4. The display device according to claim 3, wherein the data driver is configured to change the black bias offset voltage of the second sub-pixels in the first display area, in response to the first average data value being more than a first reference value.

5. The display device according to claim 4, wherein, as the first average data value increases, the black bias offset voltage of the second sub-pixels in the first display area increases.

6. The display device according to claim 3, wherein, as the first average data value of the first sub-pixels in the first display area changes, the data driver varies the black bias offset voltage of the first sub-pixels in the first display area.

7. The display device according to claim 2, wherein the data driver is configured to vary the black bias offset voltage of the sub-pixels based on a second average data value that is an average of the data values for the second sub-pixels in the portion of the image data.

8. The display device according to claim 7, wherein, as the second average data value of the second sub-pixels in the first display area changes, the data driver varies the black bias offset voltage of the second sub-pixels in the first display area.

9. The display device according to claim 1, wherein the data driver is configured to vary the data voltages for at least a portion of the range of the data values based on the black bias offset voltage.

10. The display device according to claim 1, wherein each of the sub-pixels comprises a light emitting element and a first transistor configured to supply a driving current to the light emitting element in response to a corresponding data voltage among the data voltages, and wherein the first transistor comprises an oxide semiconductor.

11. The display device according to claim 10, wherein at least one of the sub-pixels further comprises a color conversion pattern configured to shift a wavelength of light emitted from the light emitting element.

12. The display device according to claim 1, further comprising:

a target area determiner configured to detect a logo area in which the still image is displayed during a plurality of frames and to determine the logo area as the first display area.

13. The display device according to claim 1, further comprising:

a light stress compensator configured to calculate a first average data value that is an average of the data values for the first sub-pixels in the portion of the image data and to generate a first data voltage control signal for the first sub-pixels based on the first average data value, wherein the data driver is configured to vary the black bias offset voltage based on the first data voltage control signal.

14. The display device according to claim 1, wherein the display panel further includes a second display area excluding the first display area.

15. The display device according to claim 14, wherein, when a moving image is displayed or a still image is not displayed in the second display area, the data driver does not vary the black bias offset voltage of the sub-pixels in the second display area.

16. The display device according to claim 14, wherein the first display area and the second display area are divided by a preset reference block.

* * * * *